(12) United States Patent
Ozeki et al.

(10) Patent No.: US 11,745,695 B2
(45) Date of Patent: Sep. 5, 2023

(54) PEDESTRIAN AIRBAG DEVICE

(71) Applicant: TOYODA GOSEI CO., LTD., Kiyosu (JP)

(72) Inventors: Makoto Ozeki, Kiyosu (JP); Akira Yasuda, Kiyosu (JP); Taizo Suemitsu, Kiyosu (JP); Kimihiko Hyodo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/736,406

(22) Filed: May 4, 2022

(65) Prior Publication Data

US 2022/0371542 A1    Nov. 24, 2022

(30) Foreign Application Priority Data

May 19, 2021  (JP) .................................. 2021-84921

(51) Int. Cl.
    *B60R 21/36*        (2011.01)
(52) U.S. Cl.
    CPC .................................. *B60R 21/36* (2013.01)
(58) Field of Classification Search
    CPC ....... B60R 21/36; B60R 21/34; B60R 21/164; B60R 2021/23324; B60R 2021/23308; B60R 21/233; B60R 21/276; B60R 2021/2765
    See application file for complete search history.

(56) References Cited

U.S. PATENT DOCUMENTS

| | | | | |
|---|---|---|---|---|
| 2013/0133971 A1* | 5/2013 | Rick | ....................... | B60R 21/36 180/274 |
| 2019/0299918 A1* | 10/2019 | Ozeki | ..................... | B60R 21/36 |
| 2019/0299920 A1* | 10/2019 | Ozeki | ................... | B60R 21/201 |
| 2020/0010045 A1* | 1/2020 | Ito | .......................... | B60R 21/36 |

FOREIGN PATENT DOCUMENTS

| | | | | |
|---|---|---|---|---|
| CN | 109229052 A | * | 1/2019 | ........... B60R 21/205 |
| JP | 2019-151138 A | | 9/2019 | |
| JP | 2020164025 A | * | 10/2020 | ............. B60R 21/36 |

OTHER PUBLICATIONS

Guan, CN-109229052-A, Jan. 2019, Machine Translation of Specification (Year: 2019).*
Nagasawa, JP-2020164025-A, Oct. 2020, Machine Translation of Specification (Year: 2020).*

* cited by examiner

*Primary Examiner* — Paul N Dickson
*Assistant Examiner* — Matthew Joseph Ganci
(74) *Attorney, Agent, or Firm* — POSZ LAW GROUP, PLC

(57) ABSTRACT

A pedestrian airbag device includes an airbag, which is housed folded in a vicinity of a rear end of a hood panel, and an inflator that supplies an inflating gas to the airbag. The airbag includes a vehicle body side wall portion disposed on a body side when inflation is completed, and a pedestrian side wall portion disposed opposing the vehicle body side wall portion. An internal pressure maintenance chamber is enclosed by a peripheral wall coupled to the vehicle body side wall portion and the pedestrian side wall portion, and is configured such that an inflating gas discharged from the inflator can flow into an interior via a general inflating portion in the airbag. A check valve mechanism that prevents a backflow to the general inflating portion side of the inflating gas that has flowed into the interior is disposed in the internal pressure maintenance chamber.

7 Claims, 17 Drawing Sheets

PEDESTRIAN AIRBAG DEVICE

CROSS REFERENCE TO RELATED APPLICATIONS

The present application claims priority from Japanese Patent Application No. 2021-84921 of Ozeki et al., filed on May 19, 2021, the entire disclosures of which is incorporated herein by reference.

BACKGROUND

1. Technical Field

The present disclosure relates to a pedestrian airbag device including an airbag which is folded and housed in a housing region disposed in a vicinity of a rear end of a vehicle hood panel, and an inflator that supplies an inflating gas to the airbag.

2. Description of Related Art

As an existing pedestrian airbag device, there is a pedestrian airbag device of a configuration including an airbag that inflates in such a way as to cover a region from an upper face side of a region from a rear end side of a hood panel to a cowl to a lower front face of left and right front pillars when inflation is completed, as shown in JP-A-2019-151138. In this pedestrian airbag device, the airbag is configured in such a way that an internal region is divided in two, front and rear, by a partitioning wall, and backflow preventing means that restricts a backflow of inflating gas from a front side chamber to a rear side chamber is disposed in the partitioning wall.

In the existing pedestrian airbag device, an internal pressure of the front side chamber is maintained when inflation is completed owing to the backflow preventing means being disposed. However, in the existing pedestrian airbag device, the airbag is simply of a configuration wherein the internal region is partitioned into two portions front and rear, the front side chamber is disposed over the whole of a left-right region of the airbag when inflation is completed. Because of this, a capacity of the front side chamber is large, a large inflator is needed in order to maintain a high internal pressure of the inflated front side chamber, and there is room for improvement in terms of maintaining internal pressure in a predetermined place using a simple configuration.

SUMMARY

The present disclosure relates to a pedestrian airbag device of the following configuration.

The pedestrian airbag device includes an airbag, which is housed folded in a housing region disposed in a vicinity of a rear end of a hood panel of a vehicle, and an inflator that supplies an inflating gas to the airbag, wherein the airbag is configured in such a way as to cover an upper face side of at least a region from a rear end side of the hood panel to a cowl when inflation is completed, includes a vehicle body side wall portion disposed on a body side when inflation is completed and a pedestrian side wall portion disposed opposing the vehicle body side wall portion, and is of a configuration wherein an internal pressure maintenance chamber enclosed by a peripheral wall coupled to the vehicle body side wall portion and the pedestrian side wall portion is disposed in one portion of an internal region, the internal pressure maintenance chamber is configured in such a way that an inflating gas discharged from the inflator can flow into an interior via a general inflating portion in the airbag, and a check valve mechanism that prevents a backflow to the general inflating portion side of the inflating gas that has flowed into the interior is disposed in the internal pressure maintenance chamber.

BRIEF DESCRIPTION OF DRAWINGS

FIGS. 17A and 17B are partially enlarged schematic sectional views showing behavior of the inner bag when the airbag inflates in the pedestrian airbag device of the embodiment, wherein FIG. 17A shows a start of airbag inflation, and FIG. 17B shows a point at which airbag inflation is completed.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
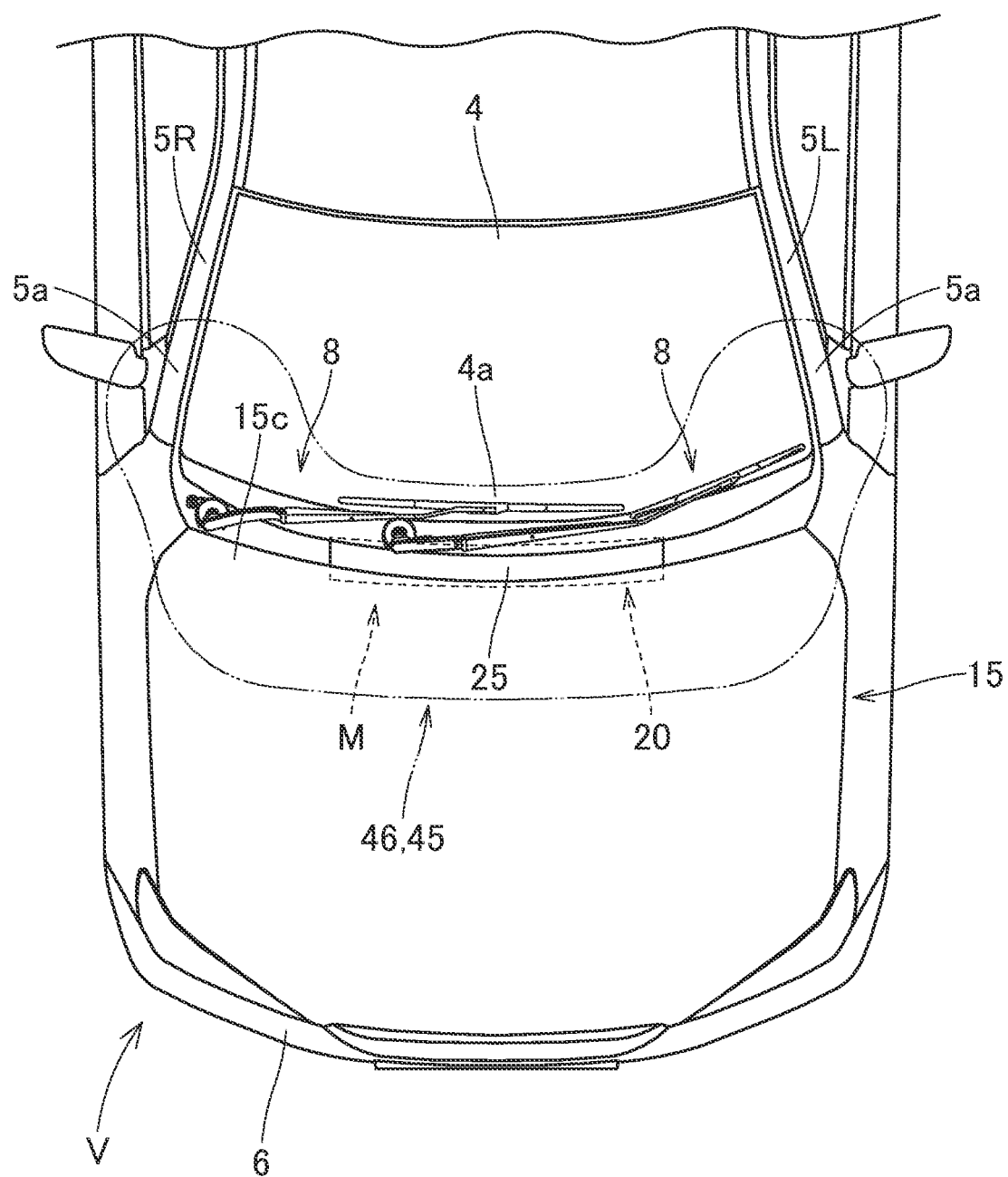
FIG. 1 is a plan view of a vehicle in which a pedestrian airbag device that is one embodiment of the present disclosure is mounted.
Figure 2:
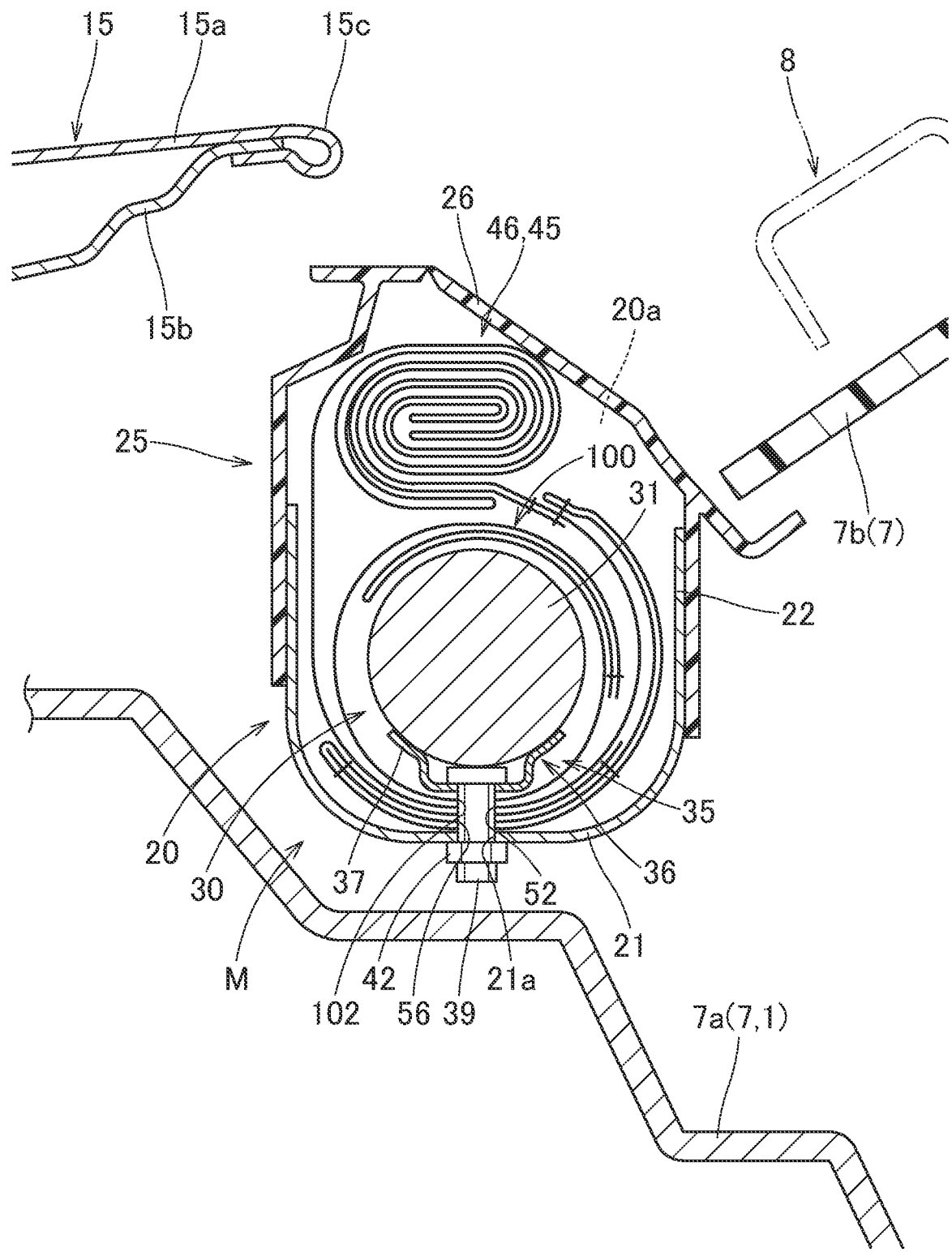
FIG. 2 is a schematic vertical sectional view following a front-rear direction of the pedestrian airbag device of the embodiment, and shows a region of an inflator.
Figure 3:
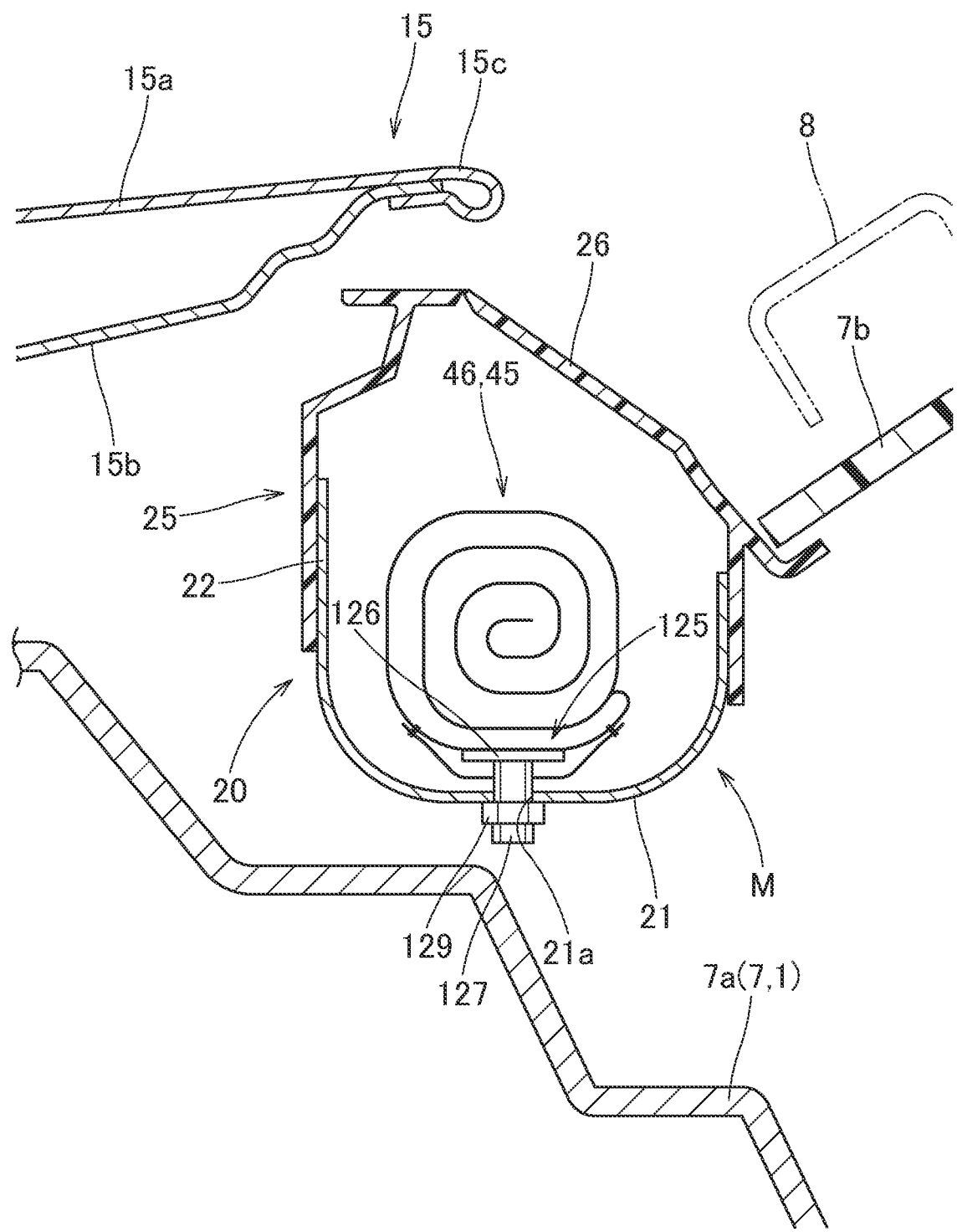
FIG. 3 is a schematic vertical sectional view following the front-rear direction of the pedestrian airbag device of the embodiment, and shows a region of an attachment bracket.

Hereafter, an embodiment of the p will be described, based on the drawings. A pedestrian airbag device M (hereafter abbreviated as "airbag device") of the embodiment is mounted in a vicinity of a rear end 15c of a hood panel 15 in a vehicle V. As shown in FIGS. 1 to 3, the airbag device M of the embodiment is disposed in a position that is a position in proximity to the rear end 15c of the hood panel 15, in an approximate center in a left-right direction of the vehicle V between left and right front pillars 5L and 5R. In the specification, a description is given with front-rear, up-down, and right-left directions coinciding with front-rear, up-down, and right-left directions of the vehicle V, unless stated otherwise.

Figure 15:
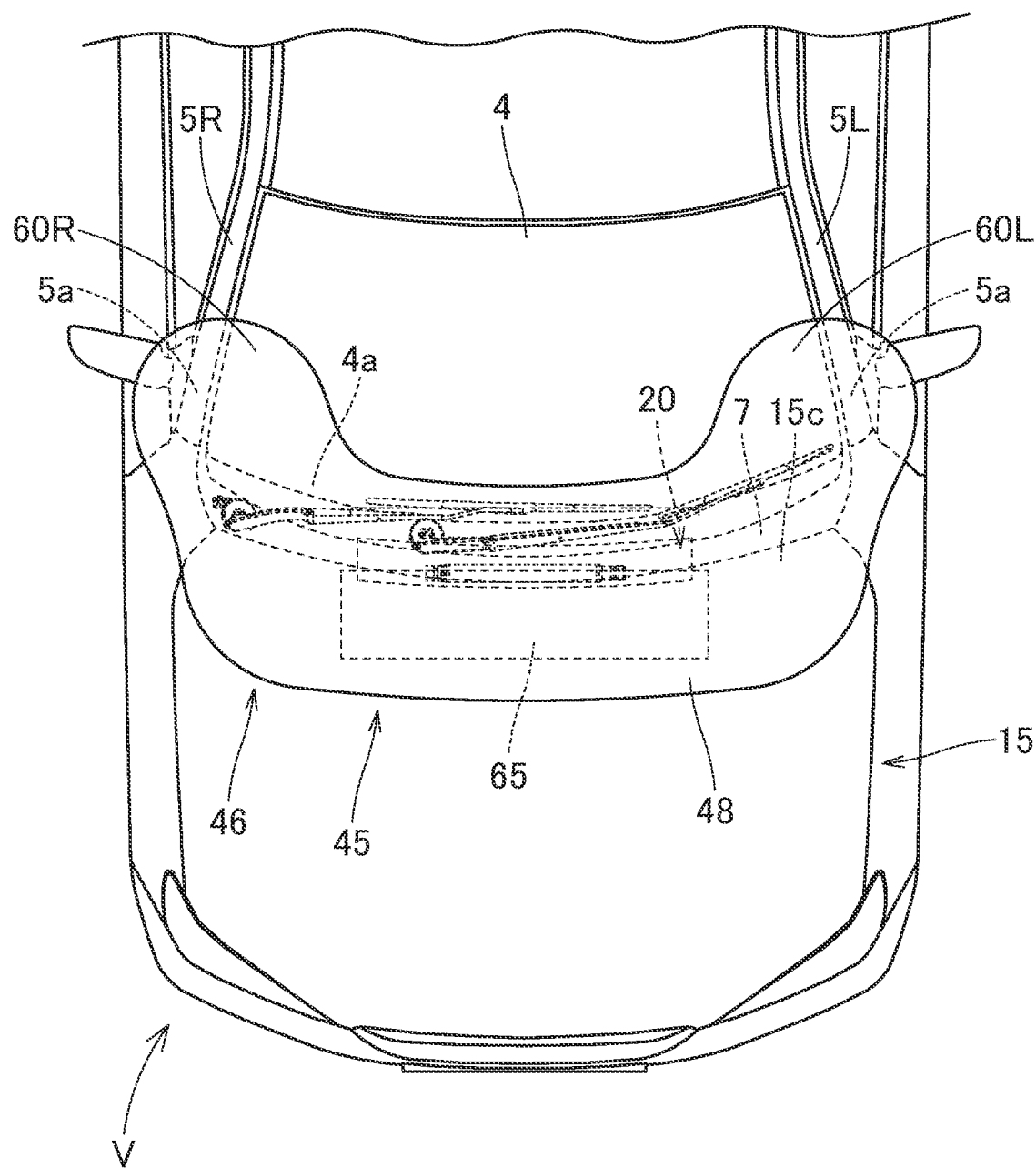
FIG. 15 is a schematic plan view showing a state wherein inflation of the airbag is completed in the pedestrian airbag device of the embodiment.
Figure 16:
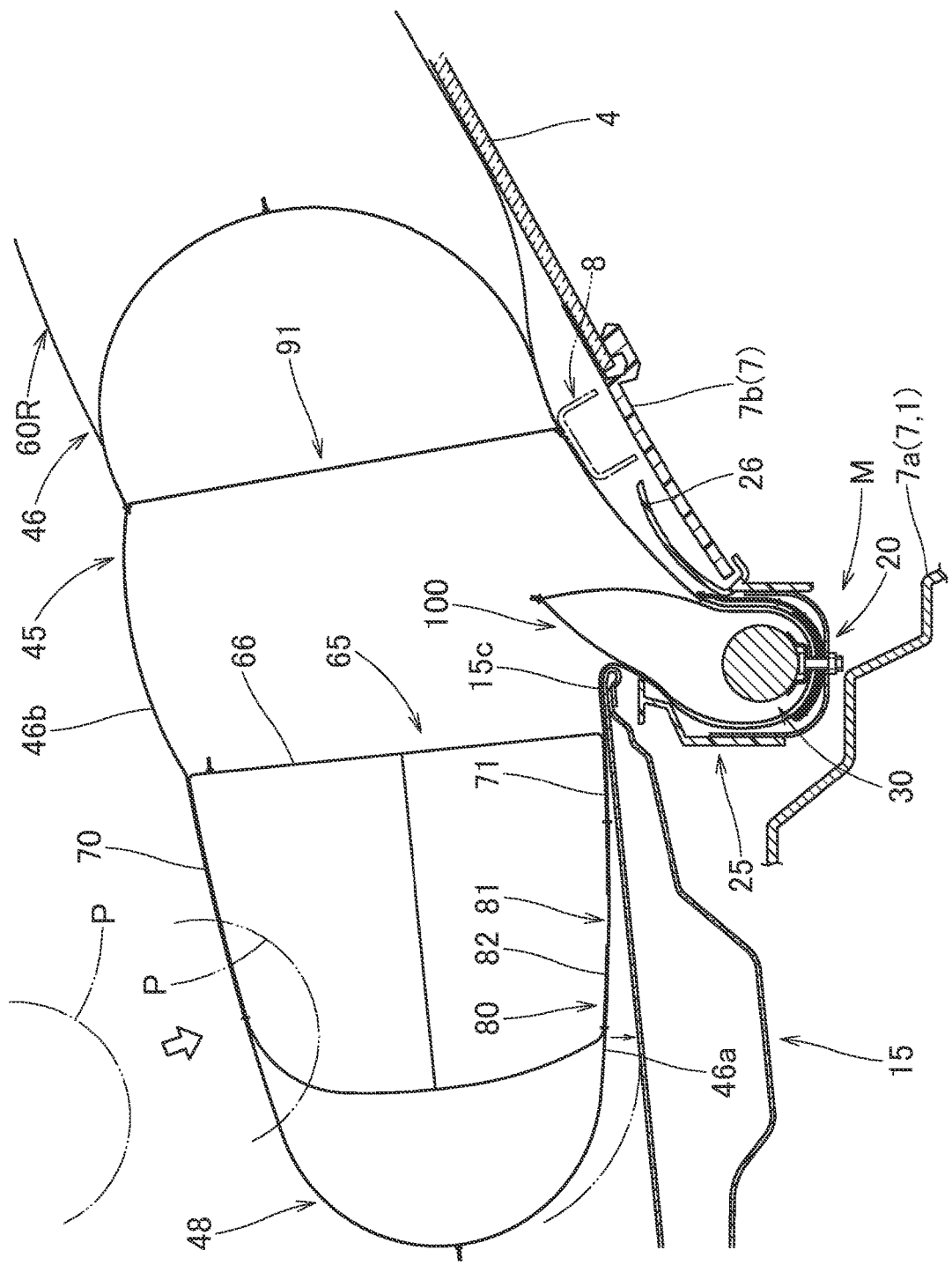
FIG. 16 is a schematic vertical sectional view showing a state wherein inflation of the airbag is completed in the pedestrian airbag device of the embodiment.

As shown in FIGS. 1 and 15, the hood panel 15 is disposed in such a way as to cover an engine room of the vehicle V from above, and is coupled to a body 1 side of the vehicle V by an unshown hinge portion disposed in a vicinity of the rear end 15c on both left and right edge sides in such a way as to be openable and closable from the front. In the case of the embodiment, the hood panel 15 is formed of a steel plate or a sheet material of aluminum (an aluminum alloy) or the like, and includes an outer panel 15a and an inner panel 15b, as shown in FIGS. 2, 3, and 16. As shown in FIGS. 1 and 15, the hood panel 15 is such that the rear end 15c side is caused to curve in the left-right direction in such a way that a left-right direction center is positioned to the front and both left-right direction end sides are positioned to the rear, in order to coincide with a front windshield 4 to be described hereafter.

As shown in FIGS. 2, 3, and 16, a cowl 7 formed of a cowl panel 7a of a high rigidity on the body 1 side and a cowl louver 7b made from a synthetic resin above the cowl panel 7a is disposed to the rear of the hood panel 15. The cowl louver 7b is disposed in such a way that a rear end side is continuous with a lower portion 4a side of the front windshield 4. The cowl 7 is also formed to be curved in order to coincide with the curved form of the rear end 15c of the hood panel 15 (refer to FIGS. 1 and 15). Also, two wipers 8 are disposed in a region of the cowl 7, as shown in FIG. 1. These wipers 8 are disposed in such a way as to protrude upward from the cowl louver 7b, as indicated by two-dot chain lines in FIGS. 2, 3, and 16. The front pillars 5L and 5R are disposed outward of the front windshield 4 on the left and right.

As shown in FIGS. 1 to 4, the airbag device M includes an airbag 45, an inflator 30 that supplies an inflating gas to the airbag 45, a case 20 acting as a housing region that houses the airbag 45 and the inflator 30, an airbag cover 25 that covers the folded-up airbag 45, and two attachment brackets 125 that attach attachment piece portions 95, to be described hereafter, of the airbag 45 to the case 20.

The case 20 acting as a housing region is made of sheet metal and, as shown in FIGS. 2 and 3, is of an approximate box form including a bottom wall portion 21 and a peripheral wall portion 22 of an approximately rectangular tube form configured in such a way as to extend upward from the bottom wall portion 21 and to be opened on an upper end side. The case 20 is of a configuration wherein the airbag 45 to be inflated is caused to protrude from an upper end side protrusion aperture 20a. Attachment holes 21a, through which each of an attachment bolt 39 that attaches the inflator 30 and each of an attachment bolt 127 that attaches the attachment piece portions 95 of the airbag 45 are inserted and attached by fastening with nuts 42 and 129, are formed in the bottom wall portion 21 (refer to FIGS. 2 to 4). In the case of the embodiment, the case 20 is disposed in such a way that a front side region is positioned immediately below the rear end 15c of the hood panel 15 and a rear side region is positioned farther to the rear side than the hood panel 15, and is attached to the cowl panel 7a on the body 1 side using an unshown bracket.

The airbag cover 25 is made from a soft synthetic resin such as a polyolefin-based thermoplastic elastomer (TPO), and is disposed in such a way as to cover the protrusion aperture 20a on the upper end side of the case 20. The airbag cover 25 includes a door portion 26 that can open toward the rear side by being pressed by the airbag 45 when the airbag 45 becomes inflated (refer to FIGS. 2, 3, and 16). The airbag cover 25 is such that a predetermined place is attached to the case 20 using unshown attachment means.

The inflator 30 includes an inflator main body 31, whose external form is approximately cylindrical, and an attachment bracket 35 for attaching the inflator main body 31 to the case 20.

Figure 4:
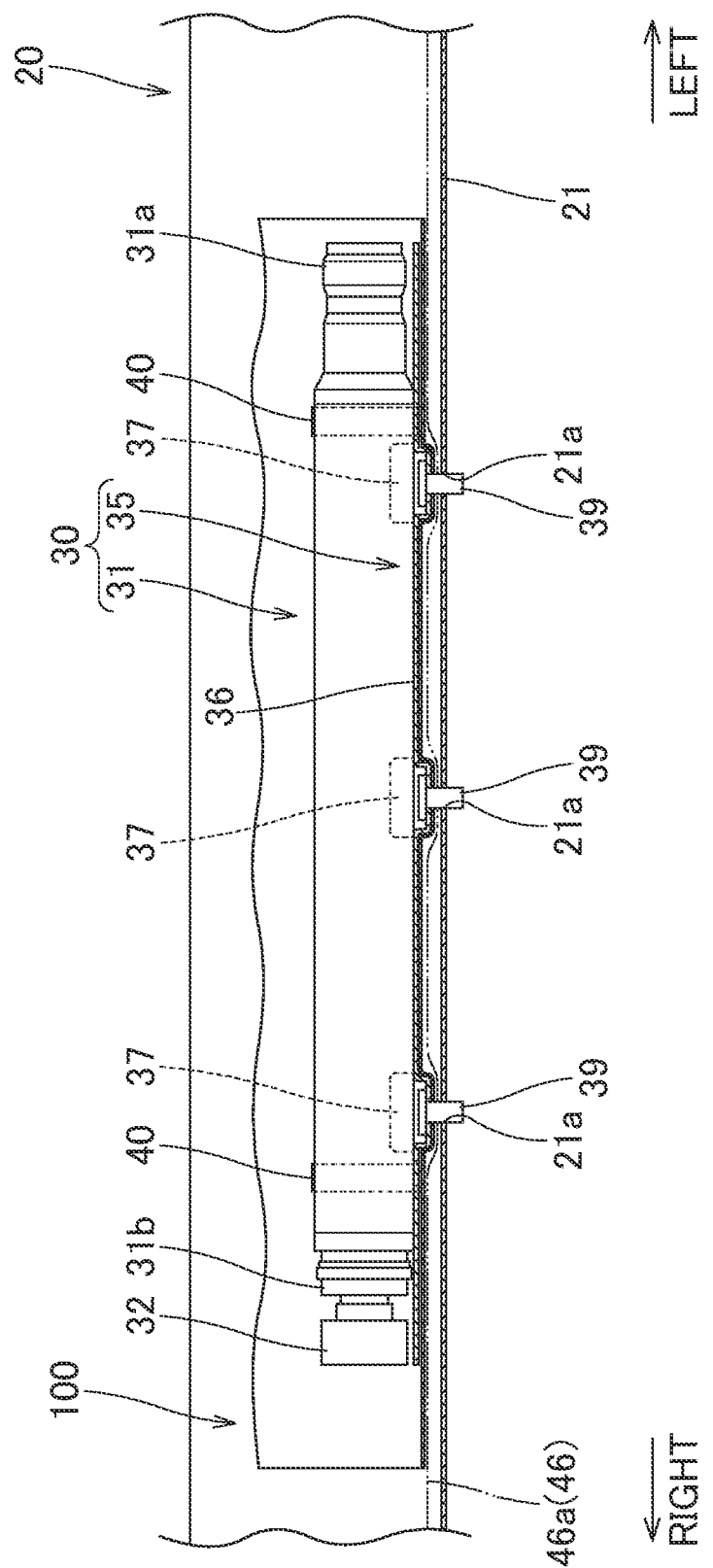
FIG. 4 is a schematic vertical sectional view following a right-left direction showing a region of the inflator in the pedestrian airbag device of the embodiment.
Figure 5:
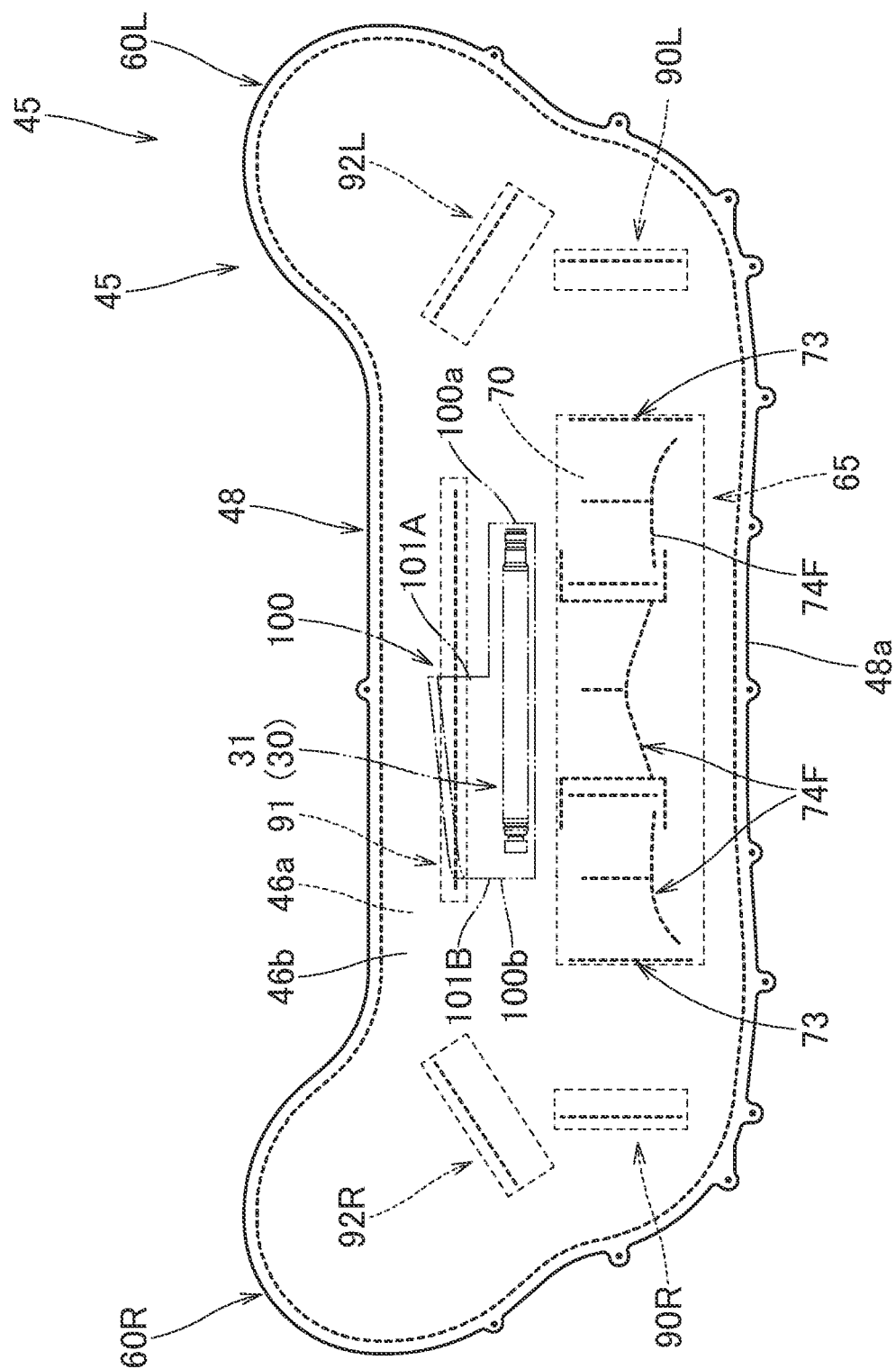
FIG. 5 is a plan view showing an airbag used in the pedestrian airbag device of the embodiment in a state wherein the airbag is flat.
Figure 6:
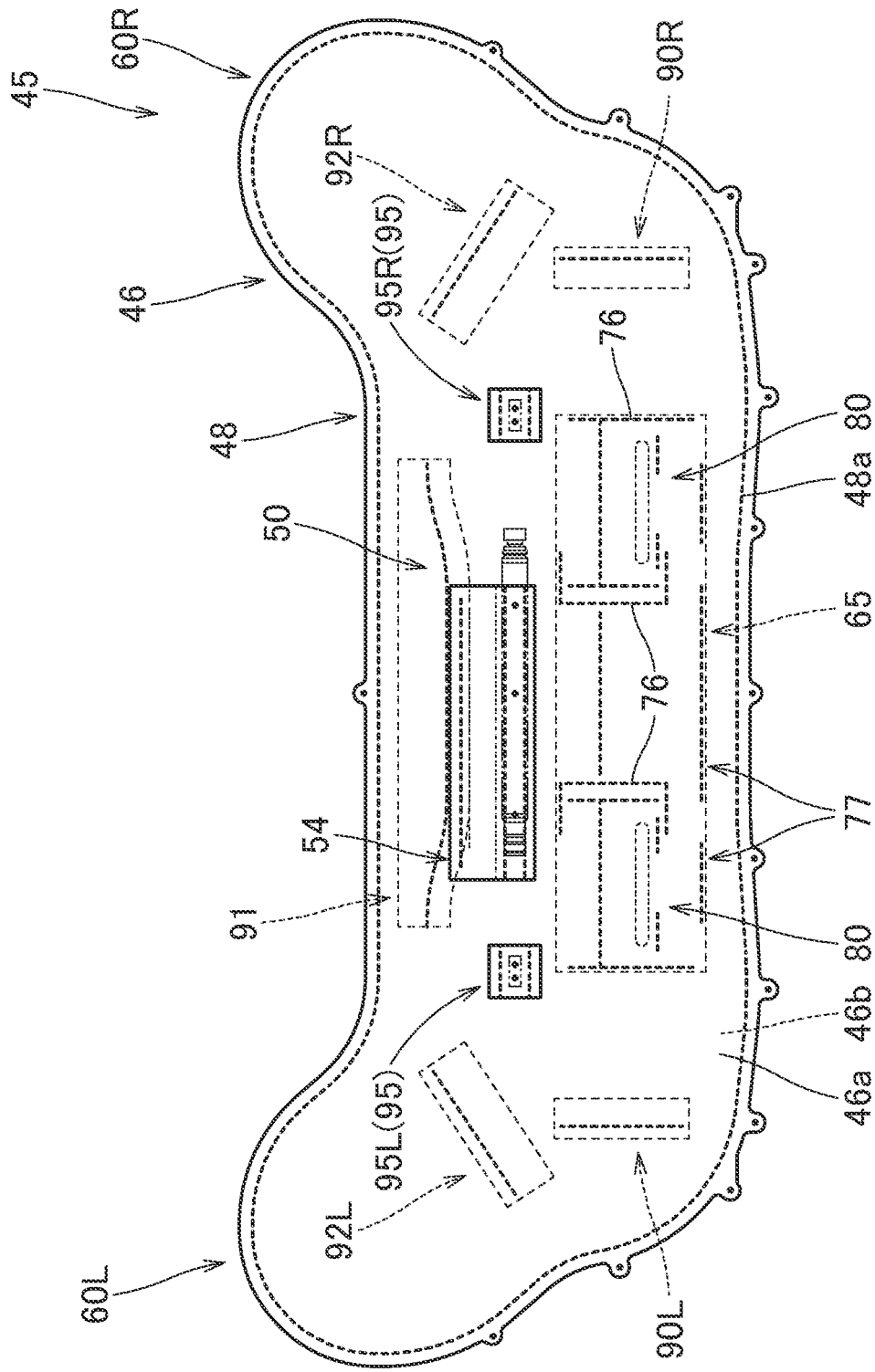
FIG. 6 is a bottom view of the airbag of FIG. 5 in a state wherein the airbag is flat.
Figure 7:
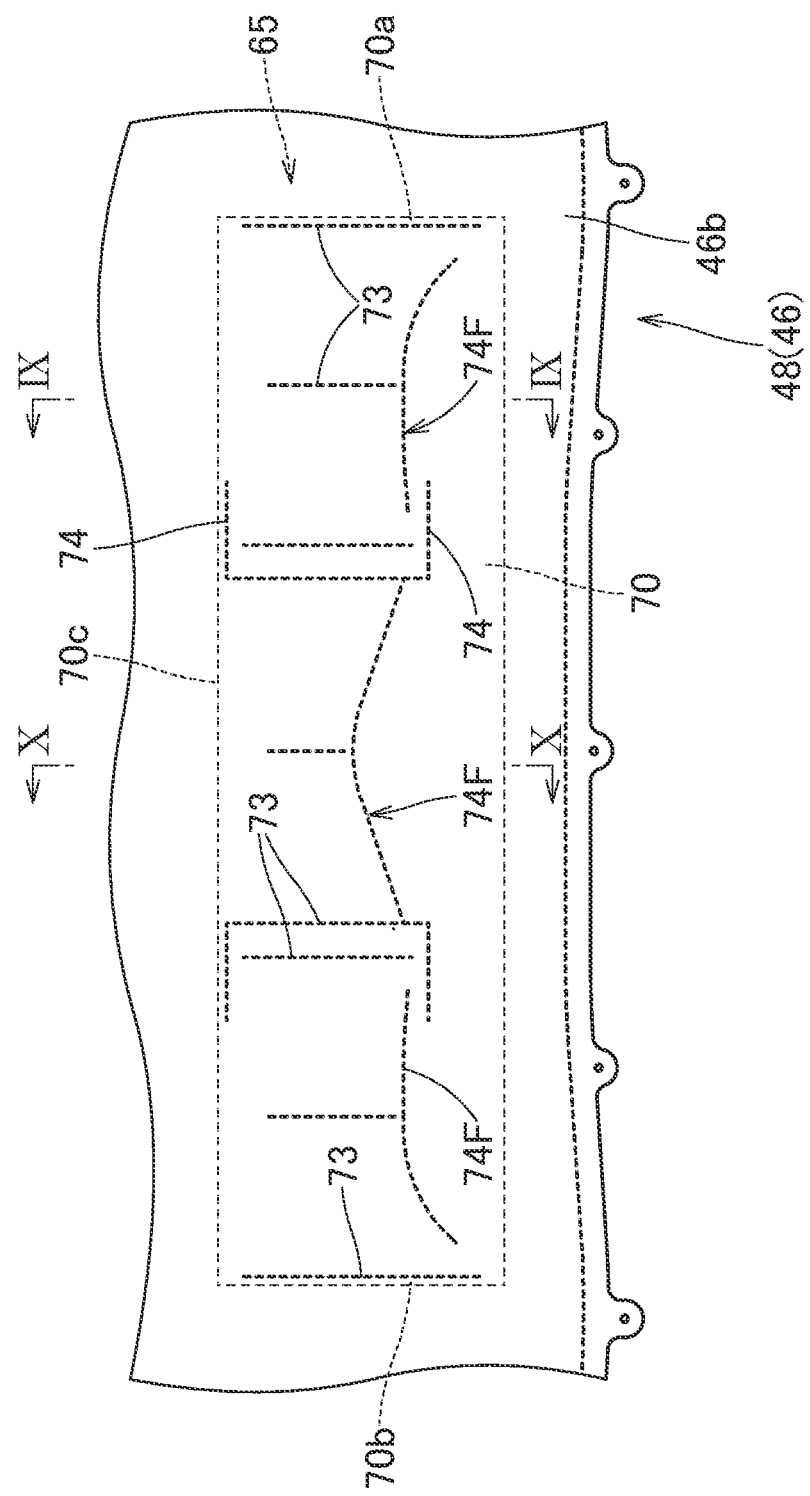
FIG. 7 is a partially enlarged plan view showing a region of an inner bag in the airbag of FIG. 5.

An external form of the inflator main body 31 is approximately cylindrical, and the inflator main body 31 is disposed in an interior in a position in an approximate left-right center, and slightly to the rear of a front-rear center, of a cowl cover portion 48, to be described hereafter, of a main bag 46 in the airbag 45, in such a way as to approximately follow an axial direction in the left-right direction, as shown in FIGS. 2 and 4 (refer to FIGS. 5 and 6). As shown in FIG. 4, a gas discharging unit 32 that can discharge an inflating gas is disposed on one end side (a right end 31b side in the case of the embodiment) in an axial direction of the inflator main body 31. An unshown lead is disposed on another end side (a left end 31a side) in the axial direction of the inflator main body 31. The inflator main body 31 is electrically connected to an operation circuit via the lead. An unshown sensor that can detect a collision with a pedestrian is disposed in a front bumper 6 (refer to FIG. 1) of the vehicle V in which the airbag device M of the embodiment is mounted. When detecting a collision between the vehicle V and a pedestrian based on a signal from the sensor, the operation circuit causes the inflator main body 31 to operate.

As shown in FIGS. 2 and 4, the attachment bracket 35 for attaching the inflator main body 31 to the case 20 includes a holding portion 36, which holds the inflator main body 31, and a multiple (three in the case of the embodiment) of the attachment bolt 39 protruding downward from the holding portion 36. The holding portion 36 is made from sheet metal, and is of a strip form extending to approximately follow the left-right direction (the axial direction of the inflator main body 31) in such a way as to support a lower face side of the inflator main body 31. A holding piece portion 37 that supports the inflator main body 31 is formed in such a way as to protrude on both front and rear sides in a multiple of places (three places in the case of the embodiment) following the right and left direction in the holding portion 36. Each holding piece portion 37 is formed inclined so as to be capable of supporting an outer peripheral surface of the inflator main body 31 in such a way that leading ends extend toward an upper side, while heading outward front and rear, from front and rear edge portions of the holding portion 36, and is symmetrical in the front-rear direction (refer to FIG. 2). In the case of the embodiment, the holding piece portions 37 are formed in positions corresponding to the attachment bolts 39. The attachment bolts 39 are formed in such a way as to protrude downward one each in three places, those being both left and right end sides and an approximate left-right center of the holding portion 36. Further, in the embodiment, the attachment bracket 35 is of a configuration such that, in a state wherein the inflator main body 31 is caused to be held in the holding portion 36, the inflator main body 31 is attached by a clamp 40 being wrapped around from an outer peripheral side. In the case of the embodiment, the clamp 40 is disposed in two places on left and right end sides of the holding portion 36 (refer to FIG. 4).

The inflator 30 is attached to the bottom wall portion 21 of the case 20 in a state wherein the inflator main body 31 is attached to the attachment bracket 35 using the clamp 40. At this time, the inflator main body 31 and the holding portion 36 in the attachment bracket 35 are inserted into the interior of the airbag 45 in such a way as to cause the attachment bolts 39 to protrude to an exterior from insertion holes 52 and attachment holes 56, to be described hereafter. Specifically, the inflator 30 is attached to the case 20, together with the airbag 45, by each attachment bolt 39 protruding from a cover panel 54, to be described hereafter, in the airbag 45 being caused to protrude from the bottom wall portion 21 of the case 20 and fastened with the nut 42 (refer to FIG. 2). Also, in the embodiment, the inflator 30 is housed in the airbag 45 in a state wherein outer peripheral sides of the inflator main body 31 and the holding portion 36 in the attachment bracket 35 are covered with a tubular inner tube 100 having flexibility (refer to FIG. 16).

As shown in FIGS. 5 and 6, the airbag 45 includes the main bag 46, which configures a general inflating portion that is a region other than an internal pressure maintenance chamber in the airbag 45, an inner bag 65, which is disposed in the main bag 46 and configures the internal pressure maintenance chamber, tethers 90L, 90R, 91, 92L, and 92R, which are disposed in the main bag 46 and restrict a thickness when inflation of the main bag 46 is completed, the attachment piece portion 95 that attaches a vehicle body side wall portion 46a side, to be described hereafter, of the main bag 46 to the case 20, and the inner tube 100, which covers the outer peripheral side of the inflator 30 in the main bag 46. The main bag 46 is of a bag form formed of a sheet material having flexibility. The inner bag 65 is of a bag form formed of a sheet material having flexibility.

In the case of the embodiment, the main bag 46 is configured in such a way as to cover an upper face side of a region from the rear end 15c side of the hood panel 15 to the cowl 7, and lower sides of front faces of the left and right front pillars 5L and 5R positioned one each on left and right sides of the front windshield 4 (the cowl 7), when inflation is completed. Specifically, the external form of the main bag 46 when inflation is completed is an approximate U-form wide in a left-right direction as seen from the front side. The main bag 46 includes the cowl cover portion 48 which is disposed approximately following the left-right direction in such a way as to approximately follow the lower portion 4a of the front windshield 4, and pillar cover portions 60L and 60R, which extend rearward one each from either end of the cowl cover portion 48 and cover lower portion 5a sides of the front faces of the left and right front pillars 5L and 5R (refer to FIG. 15). Also, the main bag 46 has the vehicle body side wall portion 46a, which is disposed on the body 1 side when inflation is completed, and a pedestrian side wall portion 46b disposed opposing the vehicle body side wall portion 46a, and is of a bag form owing to outer peripheral edges of the vehicle body side wall portion 46a and the pedestrian side wall portion 46b being joined to each other (sewn together) over a whole periphery.

The cowl cover portion 48 covers the upper face side of the region from the rear end 15c of the hood panel 15 to the cowl 7 when inflation is completed. Specifically, in the case of the embodiment, the cowl cover portion 48 is configured in such a way as to cover an upper face side (front face side) of a region from a region on the rear end 15c side of the hood panel 15, via the cowl 7, to the lower portion 4a side of the front windshield 4 over an approximate whole area in a vehicle width direction (left-right direction), including also the wiper 8, when inflation is completed (refer to FIGS. 15 and 16). The airbag 45 of the embodiment is such that an insertion aperture portion 50 for inserting the inflator 30 in the interior is formed in a position in an approximate front-rear and left-right center of the cowl cover portion 48 in the vehicle body side wall portion 46a of the main bag 46.

Figure 8:
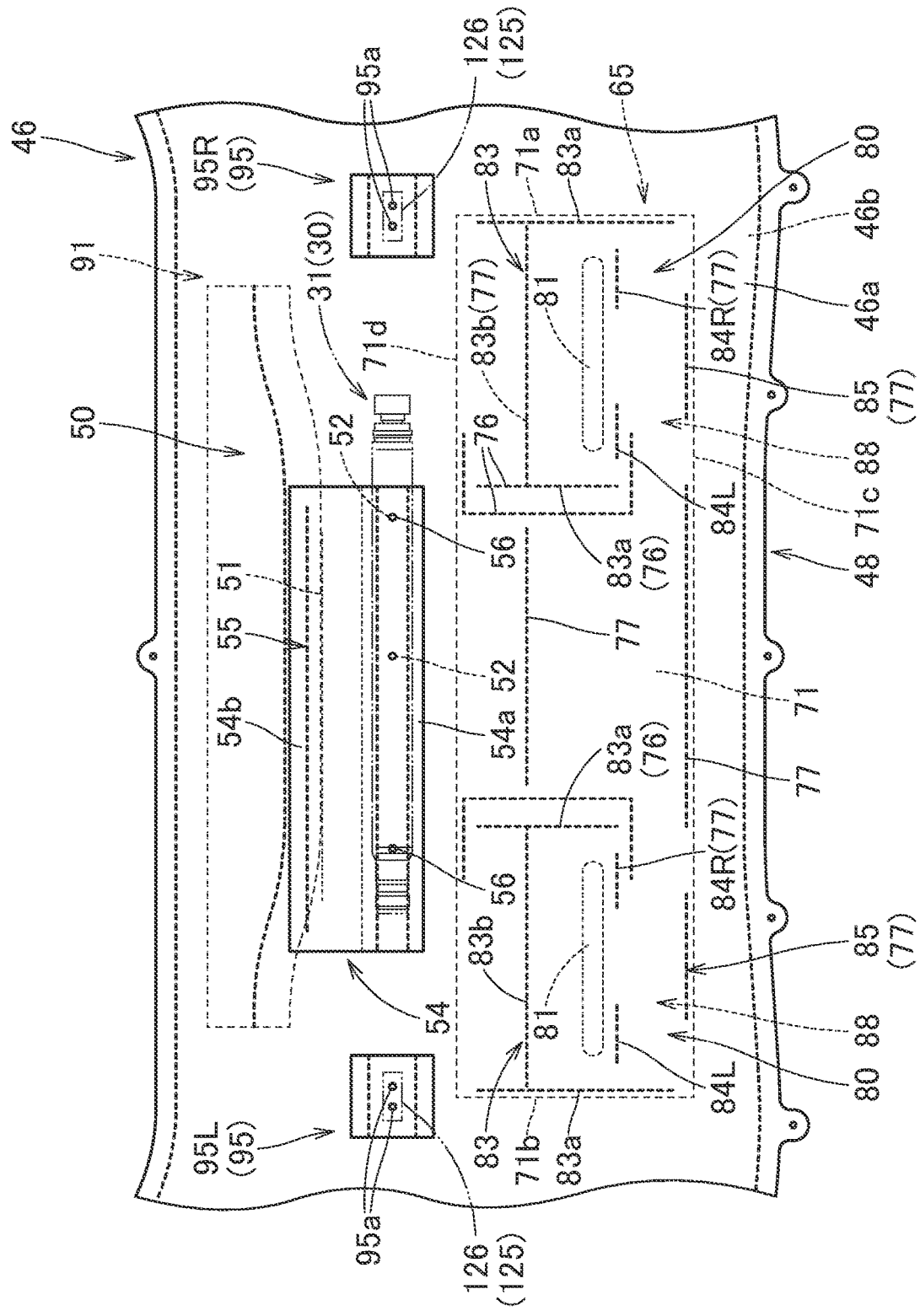
FIG. 8 is a partially enlarged bottom view showing a region of the inner bag in the airbag of FIG. 5.
Figure 13:
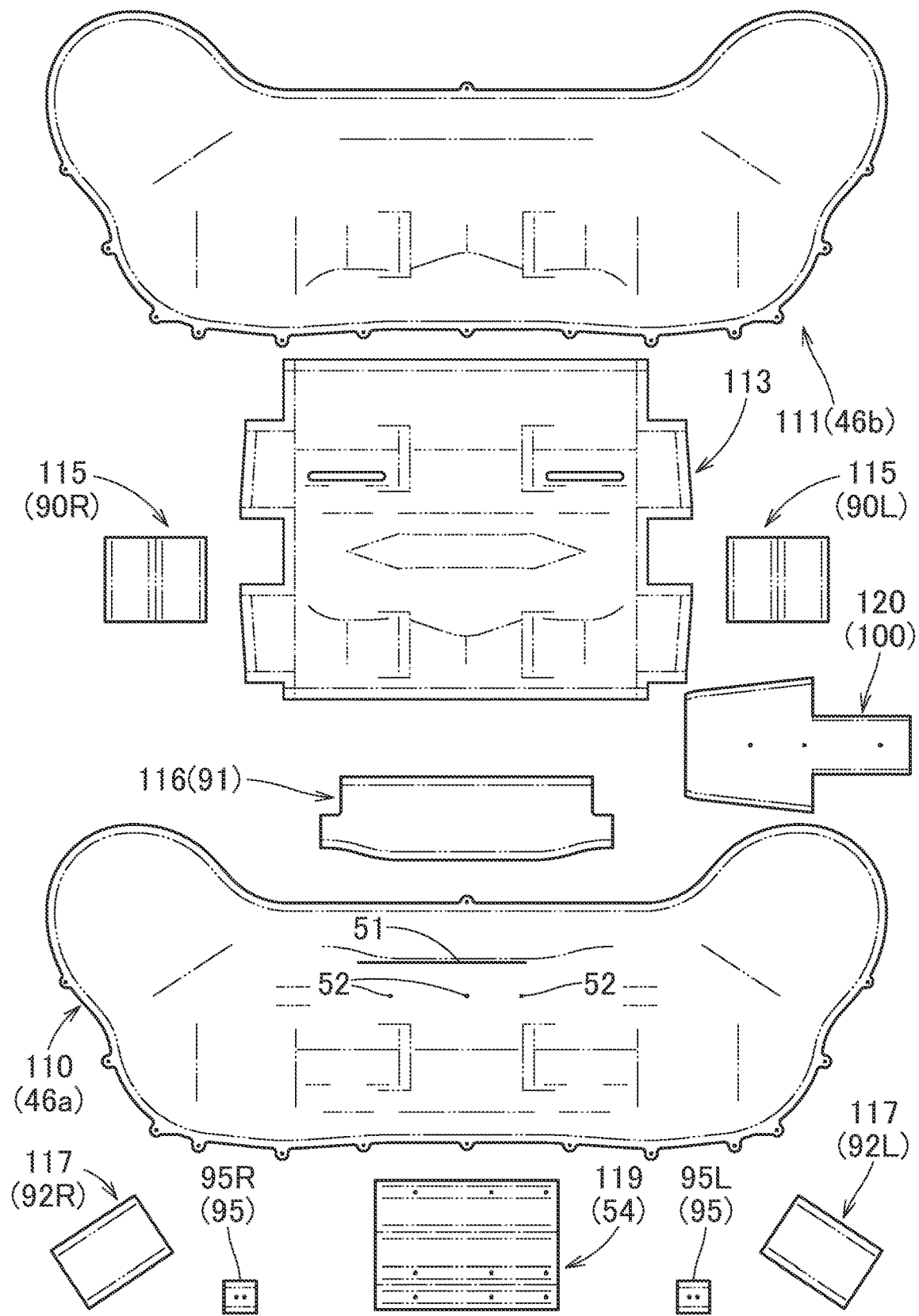
FIG. 13 is a plan view wherein base materials configuring the airbag of FIG. 5 are aligned.

Specifically, the inflator 30 is housed in a position slightly to the rear side of the front-rear center of the cowl cover portion 48, and more specifically, in a position between the inner bag 65 and the left and right tethers 91, to be described hereafter. The insertion aperture portion 50 is also disposed in a position slightly to the rear side of the front-rear center of the cowl cover portion 48. As shown in FIGS. 8 and 13, the insertion aperture portion 50 includes an insertion slit 51 formed in the vehicle body side wall portion 46a, insertion holes 52 through which the attachment bolts 39 of the inflator 30 are inserted, and the cover panel 54, which blocks off the insertion slit 51 from an outer peripheral side. The insertion slit 51 is for inserting the inflator main body 31, and is formed in a linear form approximately following the left-right direction in such a way as to approximately follow the axial direction of the inflator main body 31. A length dimension of the insertion slit 51 is set to be smaller than a length dimension of the inflator main body 31 (refer to FIG. 8). The insertion hole 52 is for causing the attachment bolt 39 of the inflator 30 to protrude, and is formed in three places following the left-right direction, corresponding to the attachment bolts 39. The insertion holes 52 are formed in a region on the front side of the insertion slit 51 in a state wherein the main bag 46 is flat. The cover panel 54 is configured of a sheet material having flexibility, and is configured in such a way as to be able to block off the insertion slit 51 on the outer peripheral side of the vehicle body side wall portion 46a, and an external form thereof is an approximately rectangular form wherein a left-right direction side is wider. The cover panel 54 is such that a rear end 54b side is caused to be joined to the vehicle body side wall portion 46a by a joining region 55 formed continuously over an approximate whole left-right area in a position on the rear side of the insertion slit 51. The attachment holes 56 for causing the attachment bolts 39 of the inflator 30 to protrude are formed corresponding to the insertion holes 52 on a front end 54a side of the cover panel 54. In the case of the embodiment, the cover panel 54 is formed from a kind of cover panel base fabric 119 shown in FIG. 13.

The inner bag 65 acting as an internal pressure maintenance chamber is configured by disposing a check valve mechanism 80 such that an inflating gas G discharged from the inflator 30 is enabled to flow into the interior via the main bag 46 acting as a general inflating portion, and a backflow to the main bag 46 side of the inflating gas G that has flowed into the interior is prevented. The inner bag 65 includes a peripheral wall portion 66, which configures a peripheral wall coupled to the vehicle body side wall portion 46a and the pedestrian side wall portion 46b of the main bag 46, a bottom wall portion 71 disposed in such a way as to close a lower end 66b side of the peripheral wall portion 66 (that is, in such a way as to block off an inner side of the peripheral wall), and a top wall portion 70 disposed in such a way as to close an upper end 66a side of the peripheral wall portion 66. The bottom wall portion 71 is disposed in such a way as to coincide with the vehicle body side wall portion 46a, and the top wall portion 70 is disposed in such a way as to coincide with the pedestrian side wall portion 46b. Also, in the case of the embodiment, a form of the inner bag 65 when inflation is completed is an approximate cuboid form wherein a longitudinal direction approximately follows the left-right direction side (refer to FIG. 11). In the case of the embodiment, the inner bag 65 is disposed in the cowl cover portion 48 of the main bag 46, as shown in FIGS. 5 and 6.

The inner bag 65 is disposed on the front side of the inflator 30, the inner bag 65 is disposed in a position slightly forward of a front-rear center, wherein a longitudinal center is caused to approximately coincide with a left-right center of the main bag 46, and a gap is provided between the inner bag 65 and a front edge 48*a* of the cowl cover portion 48. Specifically, the inner bag 65 is disposed in a position such as to cover the case 20 acting as a housing region from above and in front when inflation of the airbag 45 is completed (refer to FIGS. 15 and 16). A left-right direction side width dimension of the inner bag 65 is in the region of about two-fifths of a left-right direction side width dimension of the cowl cover portion 48. The inner bag 65 is configured to be wider in the left-right direction than the case 20, thus being able to cover the case 20 from above and in front over a whole left-right area (refer to FIG. 15). Also, in the case of the embodiment, the inner bag 65 is configured in such a way that a front-rear direction side width dimension is greater than that of the front and rear tethers 90L and 90R, and a left-right direction side width dimension is greater than that of the left and right tethers 91 (refer to FIGS. 5 and 6).

As shown in FIGS. 7 to 10, the inner bag 65 is coupled to the main bag 46. Specifically, a predetermined place in the bottom wall portion 71 is directly joined to the vehicle body side wall portion 46*a*, whereby the lower end 66*b* side of the peripheral wall portion 66 is coupled to the vehicle body side wall portion 46*a*, and a predetermined place in the top wall portion 70 is directly joined to the pedestrian side wall portion 46*b*, whereby the top end 66*a* side of the peripheral wall portion 66 is coupled to the pedestrian side wall portion 46*b*. That is, the inner bag 65 also fulfils a function of regulating a distance of separation between the vehicle body side wall portion 46*a* and the pedestrian side wall portion 46*b* when inflating, and a function of restricting a thickness of the main bag 46 when inflation is completed. The top wall portion 70 of the inner bag 65 is joined to the pedestrian side wall portion 46*b* of the main bag 46 by an upper side front-rear joining region 73 and an upper side left-right joining region 74 (refer to FIGS. 7, 9, and 10). The upper side front-rear joining region 73 approximately follows the front-rear direction, and a multiple thereof are juxtaposed on the left-right direction side. The upper side left-right joining region 74 approximately follows the left-right direction on a front end side and a rear end side of the upper side front-rear joining region 73, and a multiple thereof are disposed. Specifically, the top wall portion 70 is such that a vicinity of a left edge 70*a* and a vicinity of a right edge 70*b* are joined to the pedestrian side wall portion 46*b* side over approximately a whole front-rear area, and a part of a vicinity of a rear edge 70*c* is also joined to the pedestrian side wall portion 46*b* side (refer to FIG. 7). The bottom wall portion 71 of the inner bag 65 is joined to the vehicle body side wall portion 46*a* of the main bag 46 by a lower side front-rear joining region 76 and a lower side left-right joining region 77 (refer to FIGS. 8 to 10). The lower side front-rear joining region 76 approximately follows the front-rear direction, and a multiple thereof are juxtaposed on the left-right direction side. A multiple of the lower side left-right joining region 77 are disposed in such a way as to approximately follow the left-right direction in positions on a front edge side and slightly to the rear side of a front-rear center of the bottom wall portion 71. Specifically, the bottom wall portion 71 is such that a vicinity of a left edge 71*a*, a vicinity of a right edge 71*b*, and a vicinity of a front edge 71*c* are joined to the vehicle body side wall portion 46*a* over approximately a whole of front-rear and left-right areas, and a part of a vicinity of a rear edge 71*d* is also joined to the vehicle body side wall portion 46*a* side (refer to FIG. 8).

Figure 9:
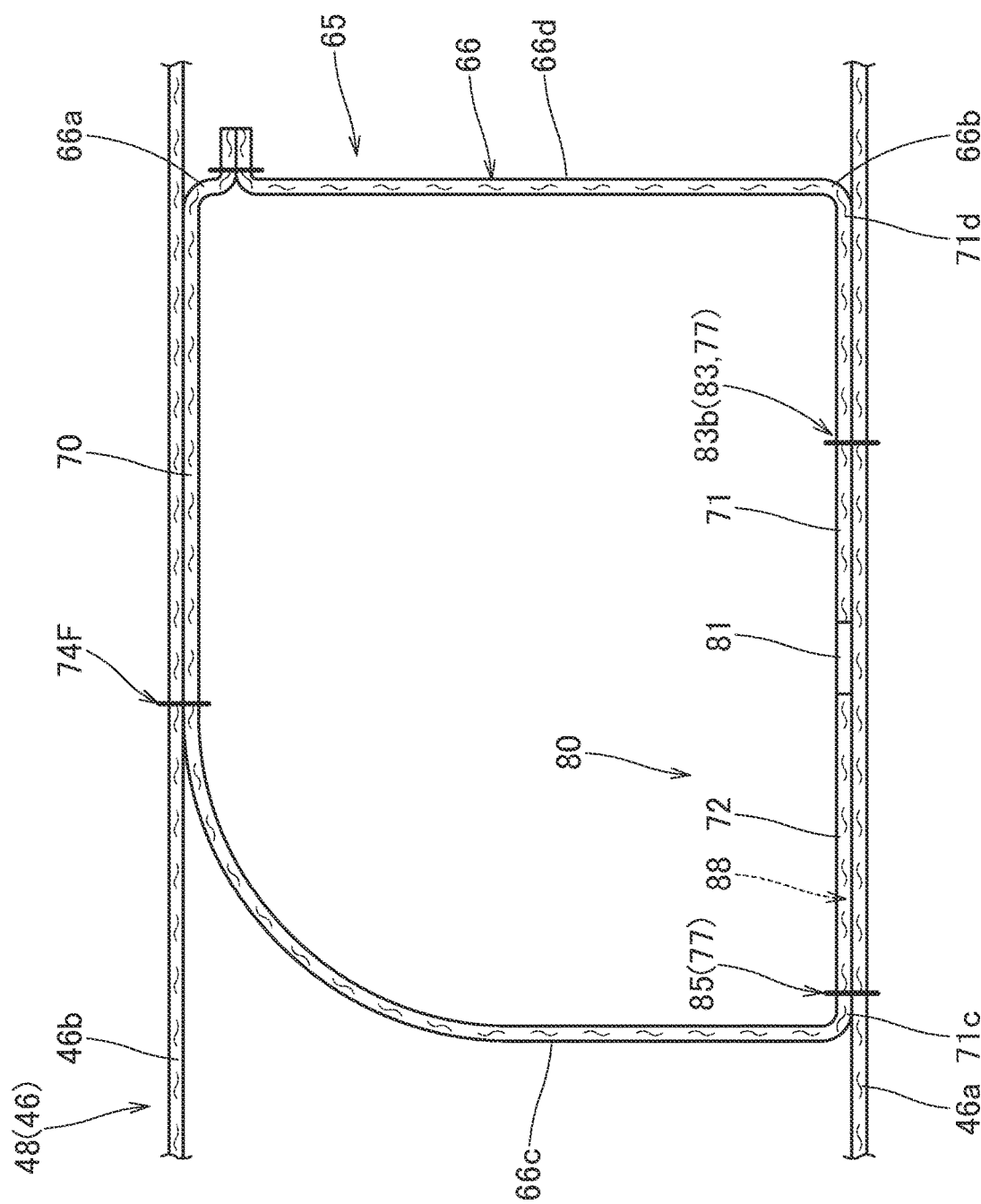
FIG. 9 is a sectional view of an IX-IX region in FIG. 7.
Figure 10:
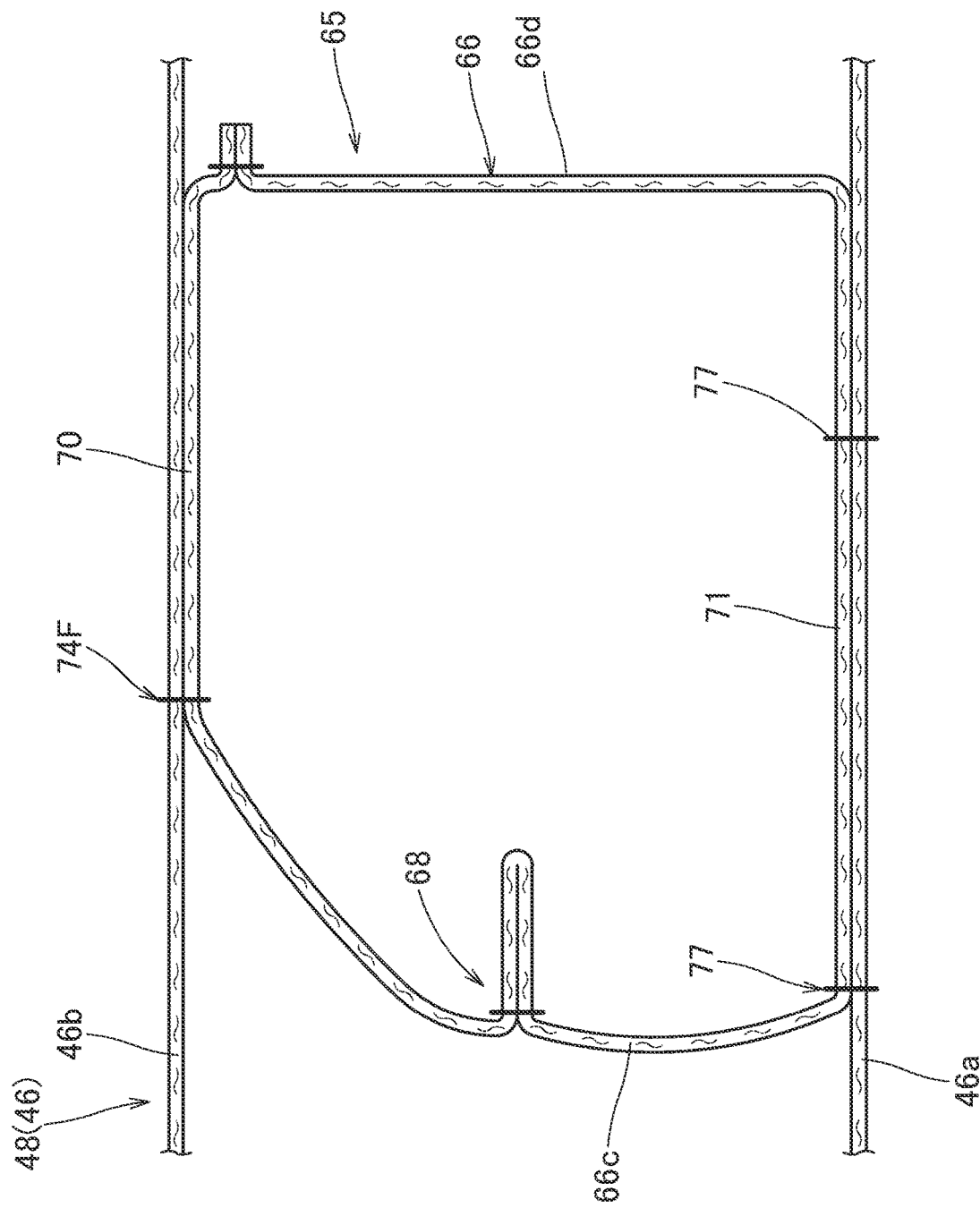
FIG. 10 is a sectional view of an X-X region in FIG. 7.
Figure 11:
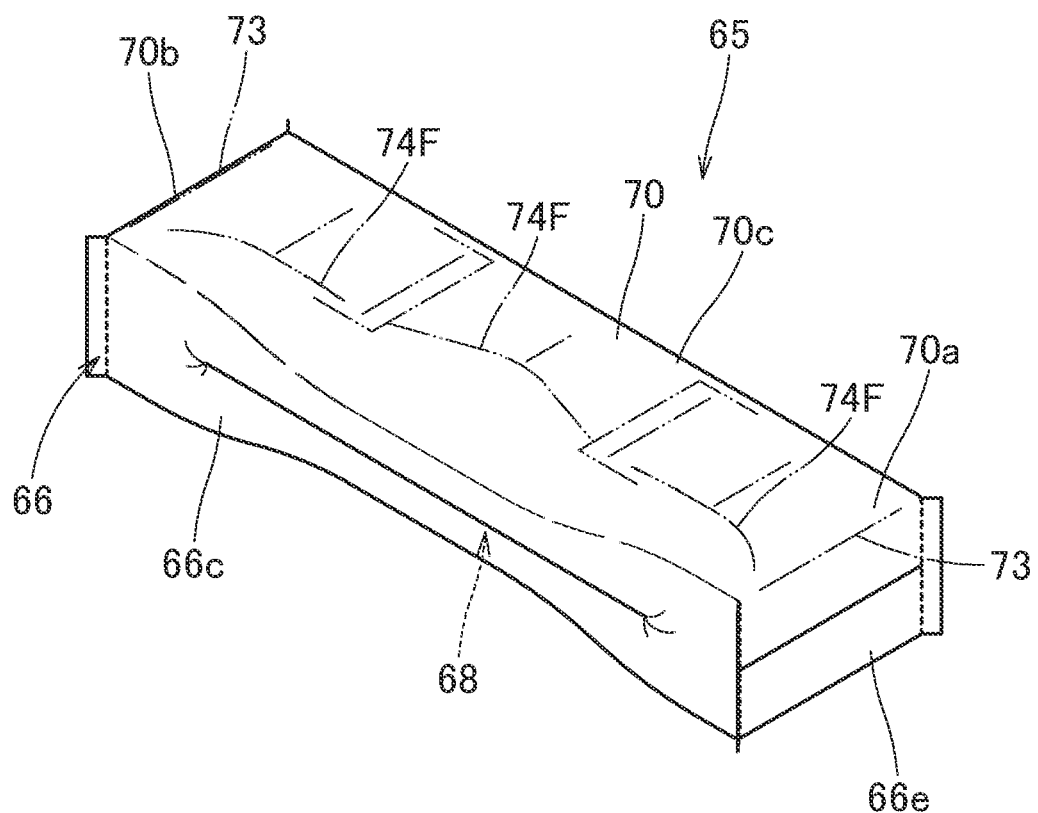
FIG. 11 is a schematic perspective view of a state wherein the inner bag has been inflated individually.
Figure 14:
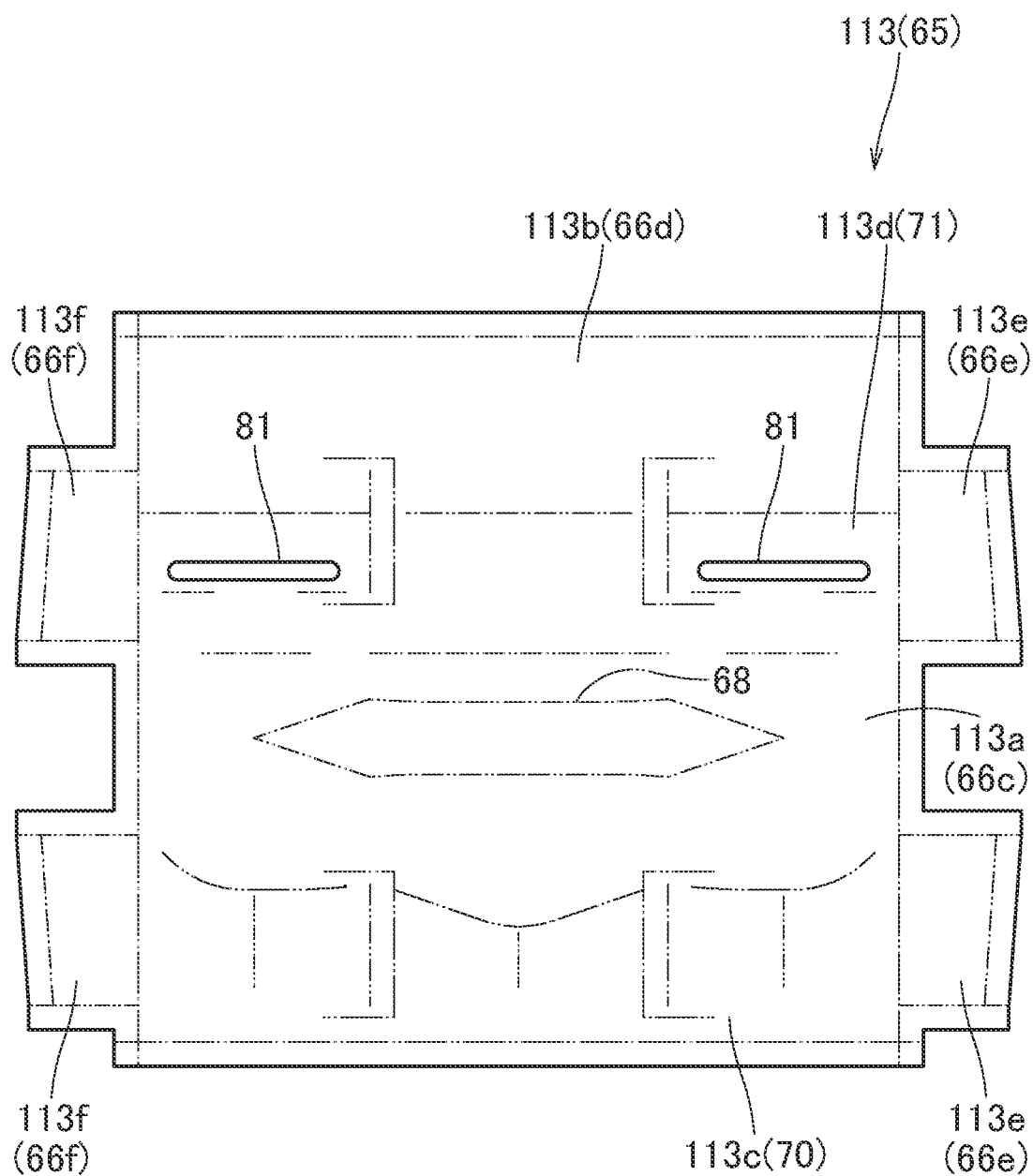
FIG. 14 is a plan view of inner bag base fabrics configuring the inner bag.

In the case of the embodiment, in the peripheral wall portion 66, a pinched portion 68, configured by pinching in such a way that an up-down direction side width dimension is reduced, thereby causing peripheral edges to join, is widely formed to the left and right in a front wall portion 66*c* disposed on the front face side when inflation is completed (refer to FIGS. 10, 11, and 14). The inner bag 65 is configured in such a way that a thickness of an external form when inflation is completed is gradually reduced toward the front edge side by the pinched portion 68. Also, in the airbag 45 of the embodiment, an upper side left-right joining region 74F disposed in a front side region in the upper side left-right joining region 74 that causes the top wall portion 70 of the inner bag 65 to be joined to the pedestrian side wall portion 46*b* is of a configuration such that three thereof are intermittently juxtaposed. And, this upper side left-right joining region 74F is disposed inclined while curving in such a way that a left-right central side is positioned farthest to the rear, and left and right end edge sides are positioned farther to the front (refer to FIG. 7). That is, the inner bag 65 is such that a front top end side is not caused to be coupled to the pedestrian side wall portion 46*b* side by the upper side left-right joining region 74F. Also, owing to the pinched portion 68 being disposed, the inner bag 65 is of a configuration wherein a front upper side region is caused to curve in such a way as to incline gently away from the pedestrian side wall portion 46*b* (refer to FIGS. 9 and 10).

Figure 12:
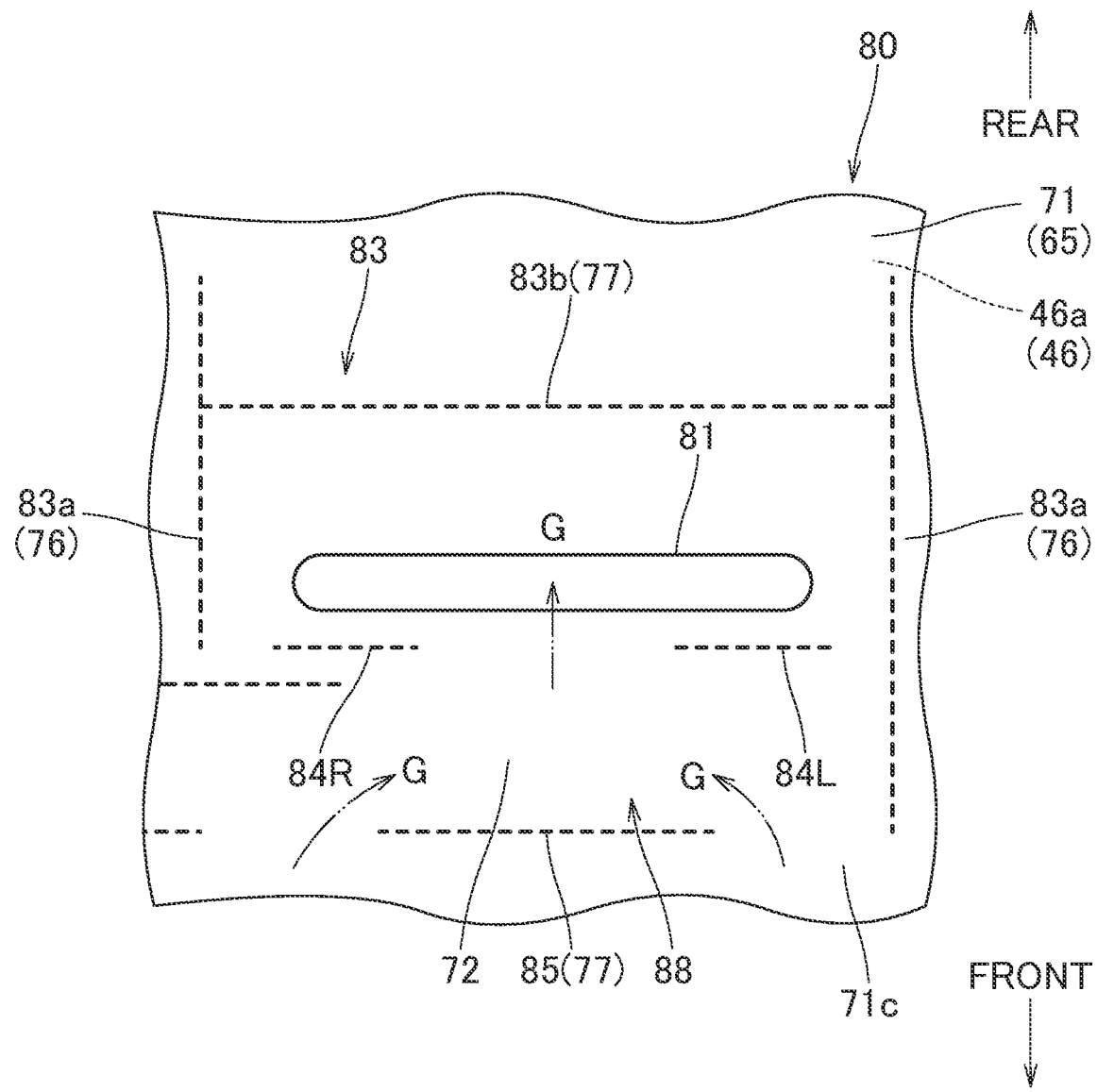
FIG. 12 is a schematic view showing a region of a check valve mechanism in the airbag of FIG. 5.

In the case of the embodiment, one check valve mechanism 80 that causes an inflating gas to flow into the inner bag 65 is formed on each of left and right sides of the inner bag 65, as shown in FIGS. 6 and 8. As shown in FIGS. 9 and 12, the check valve mechanism 80 includes a gas inflow port 81, formed by one portion (a part) of the bottom wall portion 71 being cut away, a joining region that causes the bottom wall portion 71 to be joined directly to the vehicle body side wall portion 46*a* on a peripheral edge of the gas inflow port 81, and a front edge side region 72 (a peripheral edge region) that forms a front edge side of the gas inflow port 81 in the bottom wall portion 71.

The gas inflow port 81 is of a long hole form whose longitudinal direction approximately follows the left-right direction, and in the case of the embodiment, is formed in a position that is slightly forward of the front-rear center in the bottom wall portion 71 (refer to FIGS. 8 and 9). Each gas inflow port 81 is such that a left-right direction side aperture width dimension (length dimension) is set to be in the region of about one-quarter that of a left-right direction side width dimension of the bottom wall portion 71.

As shown in FIG. 12, a section joining region 83, end edge side joining regions 84L and 84R, and a central side joining region 85 are disposed as a joining region formed in such a way as to cause the bottom wall portion 71 to be joined directly to the vehicle body side wall portion 46*a* on a peripheral edge of the gas inflow port 81. The section joining region 83 is disposed in such a way as to enclose both left and right sides and a rear of the gas inflow port 81. The end edge side joining regions 84L and 84R are disposed in regions in vicinities of both left and right ends on the front edge side of the gas inflow port 81. The central side joining region 85 is disposed on a left-right central side of the gas inflow port 81, farther to the front than the end edge side joining regions 84L and 84R. The section joining region 83 is configured of a part of the lower side front-rear joining region 76 and the lower side left-right joining region 77. The section joining region 83 has a horizontal bar portion 83*b*, disposed in such a way as to approximately follow the left-right direction to the rear of the gas inflow port 81, and two vertical bar portions 83*a* and 83*a* extending forward in such a way as to approximately follow the front-rear direction from either end of the horizontal bar portion 83*b*, and is formed continuously in such a way as to close both left and right sides and a rear side of the gas inflow port 81. Each vertical bar portion 83*a* is formed in such a way as to extend farther forward than the gas inflow port 81. That is, in the inner bag 65 of the embodiment, the gas inflow port 81 is configured in such a way that both the left and right sides and the rear side are closed, and the inflating gas G can flow into the interior from only the front side, as shown in FIG. 12. The end edge side joining regions 84L and 84R are disposed in such a way as to coincide in vicinities of both ends, excepting a left-right center, in a vicinity of a front edge of the gas inflow port 81. The end edge side joining regions 84L and 84R are of a linear form approximately following the longitudinal direction (left-right direction) of the gas inflow port 81, and are formed in such a way as to extend farther outward to the left and right than the gas inflow port 81. The central side joining region 85 is formed to be of a linear form approximately following the longitudinal direction (left-right direction) of the gas inflow port 81 and the end edge side joining regions 84L and 84R, in a position to the front of the end edge side joining regions 84L and 84R, in such a way as to be separated from the end edge side joining regions 84L and 84R on the front-rear direction side. The central side joining region 85 is formed in such a way that both end sides are caused to coincide with the end edge side joining regions 84L and 84R on the front-rear direction side.

Figure 17A:
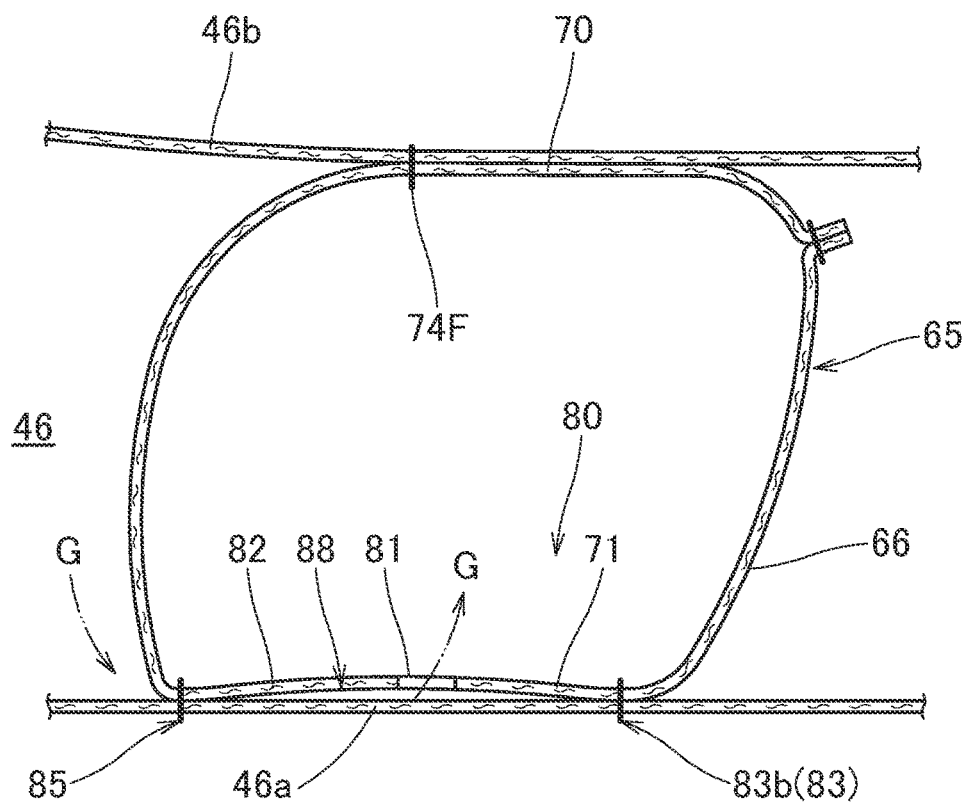
Figure 17B:
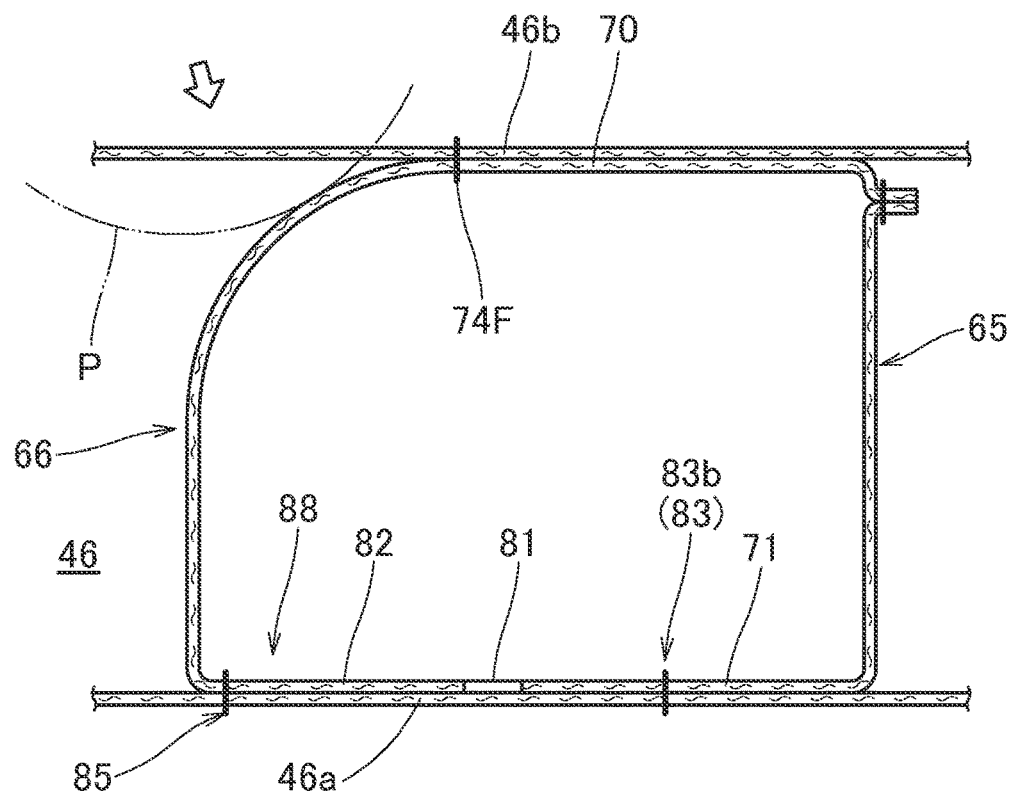

Further, in the check valve mechanism 80 of the embodiment, a front edge side region 82 (a region between the central side joining region 85 and the end edge side joining regions 84L and 84R in front of the gas inflow port 81) of the gas inflow port 81 in the bottom wall portion 71 is of an aspect such as to actually cause the gas inflow port 81 to open and close. Specifically, when the airbag 45 starts to inflate, the inflating gas G that has flowed into the main bag 46 flows from a gas channel portion 88 into the inner bag 65 via the gas inflow port 81 (refer to FIG. 17A). The gas channel portion 88 is formed from a gap between the vehicle body side wall portion 46*a* enclosed by the central side joining region 85 and the end edge side joining regions 84L and 84R and the bottom wall portion 71. Further, after inflation of the airbag 45 is completed, the front edge side region 72 in the bottom wall portion 71 is pressed to the vehicle body side wall portion 46*a* side, whereby the gas channel portion 88 is closed, and a backflow to the main bag 46 side of the inflating gas G that has flowed into the inner bag 65 is prevented (refer to FIG. 17B). The bottom wall portion 71 is such that both left and right end sides in a vicinity of the front edge of the gas inflow port 81 are joined directly to the vehicle body side wall portion 46*a* by the end edge side joining regions 84L and 84R, and the front side of the gas inflow port 81 (a front edge side of the gas channel portion 88) is joined directly to the vehicle body side wall portion 46*a* by the central side joining region 85. Because of this, the bottom wall portion 71 can stably maintain the closed state of the front edge side region 72 (the gas channel portion 88) on the front edge side of the gas inflow port 81 after inflation of the inner bag 65.

The inner bag 65 is configured of a kind of inner bag base fabric 113 shown in FIG. 14. In the inner bag base fabric 113, a front wall configuring portion 113*a* configuring the front wall portion 66*c* of the peripheral wall portion 66, a rear wall configuring portion 113*b* configuring a rear wall portion 66*d* of the peripheral wall portion 66, a top wall configuring portion 113*c* configuring the top wall portion 70, and a bottom wall configuring portion 113*d* configuring the bottom wall portion 71, are continuous on a lateral direction side. Also, in the inner bag base fabric 113, a left wall configuring portion 113*e* and a right wall configuring portion 113*f* protrude one each from left and right sides of the top wall configuring portion 113*c* and the bottom wall configuring portion 113*d*. The left wall configuring portion 113*e* and the right wall configuring portion 113*f* configure a left wall portion 66*e* and a right wall portion 66*f* in the peripheral wall portion 66. Further, the inner bag 65 is formed in a bag form by corresponding edge portions of the inner bag base fabric 113 being sewn to each other (joined).

In the case of the embodiment, the front-rear tethers 90L and 90R, the left-right tether 91, and the end side tethers 92L and 92R are disposed as tethers disposed in the main bag 46. The front-rear tethers 90L and 90R, the left-right tether 91, and the end side tethers 92L and 92R couple the pedestrian side wall portion 46*b* and the vehicle body side wall portion 46*a* in the main bag 46, and regulate the distance of separation between the pedestrian side wall portion 46*b* and the vehicle body side wall portion 46*a* when inflation is completed. The front-rear tethers 90L and 90R are disposed in such a way as to approximately follow the front-rear direction on the left and right sides respectively of the inner bag 65. The right-left tether 91 is disposed in such a way as to approximately follow the left-right direction on the rear side of the insertion aperture portion 50. The end side tethers 92L and 92R are disposed inclined with respect to the left-right direction in such a way that left and right inner sides are positioned to the rear in vicinities of boundary regions between the cowl cover portion 48 and the pillar cover portions 60L and 60R respectively. The front-rear tethers 90L and 90R, the left-right tether 91, and the end side tethers 92L and 92R are disposed to have bilateral symmetry in the main bag 46.

The attachment piece portion 95 that attaches the vehicle body side wall portion 46*a* side of the main bag 46 to the case 20 is disposed on both left and right sides of the insertion aperture portion 50. Each of the attachment piece portion 95 is configured of a sheet material having flexibility separately from the main bag 46, and a front end side and a rear end side are joined (sewn to) the vehicle body side wall portion 46*a*, as shown in FIG. 8. Each of the attachment piece portion 95 is of a configuration attached to the bottom wall portion 21 of the case 20 using the attachment bracket 125. In the case of the embodiment, the attachment piece portion 95 is disposed in two places having approximate bilateral symmetry between the insertion aperture portion 50 and the end side tethers 92L and 92R in a state wherein the main bag 46 is flat, as shown in FIGS. 6 and 8. Each of the attachment piece portion 95 (95L, 95R) is for inserting an attachment plate 126, to be described hereafter, of the attachment bracket 125 between the attachment piece portion 95 and the vehicle body side wall portion 46*a* (refer to FIG. 3), and has two through holes 95*a* through which the attachment bolts 127, to be described hereafter, formed in the attachment bracket 125 can be inserted.

The inner tube 100 covering the outer peripheral side of the inflator main body 31 is configured of a sheet material having flexibility, and is of a tubular form, as indicated by a two-dot chain line in FIG. 5 and in FIG. 16. In the case of the embodiment, the inner tube 100 has a left end 100*a* side in a state wherein the inner tube 100 is flat as a base portion end, and is of a configuration wherein the inflator 30 is inserted from the left end 100a side. Both left and right end sides of the inner tube 100 are opened, and furthermore, a right end 100b side that forms a leading end side is branched. Further, two outflow ports 101A and 101B, which cause an inflating gas discharged from the inflator main body 31 to flow out to the right and diagonally upward to the left, are formed on the right end 100b side of the inner tube 100. Three insertion holes 102 for causing the attachment bolts 39 of the attachment bracket 35 holding the inflator main body 31 to protrude are formed in the inner tube 100 (refer to FIG. 2).

As shown in FIG. 13, the airbag 45 of the embodiment is configured of a vehicle body side base fabric 110 configuring the vehicle body side wall portion 46a and a pedestrian side base fabric 111 configuring the pedestrian side wall portion 46b in the main bag 46, the inner bag base fabric 113 configuring the inner bag 65, tether base fabrics 115, 116, and 117 configuring the front-rear tethers 90L and 90R, the left-right tether 91, and the end side tethers 92L and 92R respectively, the cover panel base fabric 119 configuring the cover panel 54, an inner tube base fabric 120 configuring the inner tube 100, and the attachment piece portions 95. These base fabrics (base materials) are formed by a coated fabric wherein a gas leak-preventing coating agent is applied to a surface of a woven fabric formed by weaving a polyamide-based material, a polyester-based material, or the like, being cut into a predetermined form.

Next, a mounting of the airbag device M of the embodiment in the vehicle V will be described. The inflator 30 is inserted in advance into the inner tube 100 in such a way as to cause the attachment bolts 39 to protrude from the insertion holes 102. At this time, the inflator main body 31 is held by the attachment bracket 35 using the clamps 40. Further, the airbag 45 is folded in such a way as to be able to be housed in the case 20, and an outer periphery of the folded airbag 45 (a completely folded body) is wrapped in a breakable, unshown wrapping material that prevents unfolding. At this time, the insertion aperture portion 50 and the attachment piece portions 95 in the airbag 45 are caused to be exposed in the wrapping material. Subsequently, the inflator 30 is inserted into the main bag 46, together with the inner tube 100, from the insertion slit 51 of the insertion aperture portion 50, and the attachment bolts 39 are caused to protrude from the insertion holes 52, thereby housing the inflator 30 in the interior of the main bag 46. Further, the cover panel 54 is closed in such a way as to cover the insertion slit 51, and the attachment bolts 39 are inserted through the attachment holes 56. Furthermore, the attachment brackets 125 are attached by the attachment bolts 127 being caused to protrude into the attachment piece portions 95 from the through holes 95a, thereby manufacturing an airbag assembly. Subsequently, the airbag assembly is housed in the case 20 in such a way as to cause the attachment bolts 39 and 127 to protrude from the bottom wall portion 21. The airbag 45 and the inflator 30 can be attached to the case 20 by the nuts 42 and 129 being fastened respectively on the attachment bolts 39 and 127 protruding from the bottom wall portion 21. Further, the airbag device M can be mounted in the vehicle V by attaching the airbag cover 25 to the case 20, attaching an unshown bracket extending from the case 20 to the cowl panel 7a, and connecting the inflator main body 31 to an unshown operation circuit.

In the airbag device M of the embodiment, when an unshown operation circuit detects a collision between the vehicle V and a pedestrian based on a signal from an unshown sensor disposed in the front bumper 6, the inflator 30 is operated, an inflating gas is caused to flow into the interior of the airbag 45, and the airbag 45 inflates. The inflating airbag 45 pushes open the door portion 26 of the airbag cover 25, and protrudes upward from the protrusion aperture 20a of the case 20 formed by the door portion 26 being pushed open. Further, the airbag 45 is such that inflation is completed in such a way as to cover a region from the upper face of the rear end 15c of the hood panel 15 to the upper face of the cowl 7, and the lower portion 5a sides of the front faces of the front pillars 5L and 5R (refer to FIGS. 15 and 16).

Further, in the airbag device M of the embodiment, the inner bag 65 acting as a partially partitioned internal pressure maintenance chamber is disposed in the interior of the airbag 45. The inner bag 65 is of a configuration such that the inflating gas G discharged from the inflator 30 is caused to flow into the interior via the main bag 46, which acts as a general inflating portion in the airbag 45, and is configured in such a way that a backflow of the inflating gas G that has flowed into the interior to the main bag 46 side can be prevented. Also, in the airbag device M of the embodiment, the inner bag 65 acting as an internal pressure maintenance chamber is configured of a region enclosed by the peripheral wall portion 66 (a peripheral wall) coupled to the vehicle body side wall portion 46a and the pedestrian side wall portion 46b. This means that when the pedestrian side wall portion 46b moves in such a way as to separate from the body 1 side at the time of the main bag 46 inflation, the inner bag 65 reaches a state approximating a state of negative pressure, the inflating gas G is caused to flow from the main bag 46 into the interior via the check valve mechanism 80, and the inner bag 65 inflates in the same way as the main bag 46. Furthermore, the inner bag 65 acting as an internal pressure maintenance chamber is of a configuration wherein a periphery is enclosed by the peripheral wall portion 66 acting as a peripheral wall coupled to the vehicle body side wall portion 46a and the pedestrian side wall portion 46b, that is, the inner bag 65 can be disposed in a predetermined position front-rear and left-right in the airbag 45 when inflation is completed. Because of this, freedom of disposition position and size of the inner bag 65 can be increased in comparison with an airbag in an existing pedestrian airbag device, and the inner bag 65 can also be disposed in a position separated from the outer peripheral edges of the pedestrian side wall portion 46b and the vehicle body side wall portion 46a. As a result of this, in the airbag device M of the embodiment, by the inner bag 65 acting as an internal pressure maintenance chamber being disposed in a predetermined place in the airbag 45 when inflation is completed, internal pressure of the airbag 45 in the predetermined place can be maintained. Also, a pedestrian can be caught with good cushioning and protected by the inner bag 65 acting as an internal pressure maintenance chamber in which internal pressure is maintained.

Consequently, the airbag device M of the embodiment is of a simple configuration, and internal pressure in a predetermined place can be maintained.

Also, in the airbag device M of the embodiment, the check valve mechanism 80 formed in the inner bag 65 acting as an internal pressure maintenance chamber includes the gas inflow port 81, which is formed by one portion (a part) of the bottom wall portion 71 disposed in such a way as to coincide with the vehicle body side wall portion 46a being cut away, a joining region (the section joining region 83, the end edge side joining regions 84L and 84R, and the central side joining region 85) that causes the bottom wall portion 71 to be joined directly to the vehicle body side wall portion 46a on the peripheral edge of the gas inflow port 81, and the front edge side region 72 (a peripheral edge region) of the gas inflow port 81 in the bottom wall portion 71. That is, in the airbag device M of the embodiment, although the gas inflow port 81 configuring the check valve mechanism 80 formed in the inner bag 65 is of a configuration formed by one portion (a part) of the bottom wall portion 71 disposed in such a way as to coincide with the vehicle body side wall portion 46a in the airbag 45 (the main bag 46) being cut away, the inner bag 65 acting as an internal pressure maintenance chamber is of a configuration wherein an inflating gas is caused to flow into the interior from a state of negative pressure, as heretofore described. Therefore, the inflating gas can be caused to flow smoothly into the interior of the inner bag 65 via the gas inflow port 81 formed in the bottom wall portion 71 side (refer to FIG. 17A). Also, in the periphery side of the gas inflow port 81, the bottom wall portion 71 is joined directly to the vehicle body side wall portion 46a. This means that when a pedestrian P is caught by a region of the inner bag 65 after inflation of the airbag 45 is completed, the front edge side region 72 (a peripheral edge region) of the gas inflow port 81 in the bottom wall portion 71 is restricted from becoming detached from the vehicle body side wall portion 46a, is of an aspect pressed to the vehicle body side wall portion 46a side, and can stably cause the gas channel portion 88 to be closed off. As a result of this, the inflating gas can be appropriately restricted from flowing back from the gas inflow port 81 to the main bag 46 side in the airbag 45 (refer to FIG. 17B). When such a point is not taken into consideration, a check valve mechanism need not be provided on a bottom wall portion side of an internal pressure maintenance chamber, and a configuration wherein a check valve mechanism is disposed in a peripheral wall region may be adopted.

In particular, in the airbag device M of the embodiment, both the left and right sides and the rear side of the gas inflow port 81 are closed off, and the gas inflow port 81 is continuous with the main bag 46 in a front side region only. This means that when the pedestrian P, who moves in such a way as to head downward to the rear from diagonally above and in front (refer to FIG. 16), is caught by the inner bag 65 when inflation is completed, a region of the front edge side region 72 of the gas inflow port 81 in the bottom wall portion 71 can be stably pressed to the vehicle body side wall portion 46a, without becoming detached from the vehicle body side wall portion 46a, in accompaniment to behavior of the inner bag 65 such that causes the front side to be compressed, and can stably cause the gas channel portion 88 to be closed off. A gas inflow port may be of a configuration such that an inflating gas is caused to flow into an interior from a rear side, a left side, or a right side, but when taking this kind of inner bag behavior into consideration, a configuration such that an inflating gas can flow in from a front side only is preferable. Also, in the airbag device M of the embodiment, the pinched portion 68 that reduces a vertical width dimension is formed in a region of the front wall portion 66c of the inner bag 65. Also, the upper side left-right joining region 74F that causes the top wall portion 70 of the inner bag 65 to be coupled to the pedestrian side wall portion 46b is configured curved in such a way that the left-right center is positioned on the rear side, and the upper side left-right joining region 74F is positioned farther forward toward the left and right end sides. Further, the inner bag 65 is configured curved in such a way that the front top end side when inflation is completed, which actually catches the pedestrian P, is caused to incline gently away from the pedestrian side wall portion 46b. That is, in the airbag 45 of the embodiment, the pedestrian P, who moves in such a way as to head downward to the rear from diagonally above and in front, is caught first by the cowl cover portion 48, rather than being immediately caught by the inner bag 65. Subsequently, the pedestrian P is caught by the inner bag 65, whose front top end side is curved in such a way as to meet the oncoming pedestrian P head on. Because of this, the pedestrian P can be appropriately caught by the cowl cover portion 48 in the main bag 46 and the inner bag 65.

Furthermore, in the airbag device M of the embodiment, the airbag 45 is of a configuration wherein the bag-form inner bag 65 configuring an internal pressure maintenance chamber is disposed in the interior of the main bag 46, which configures a general inflating portion. Because of this, manufacture is easy in comparison with a case wherein an internal pressure maintenance chamber is configured by a peripheral wall being coupled directly to a vehicle body side wall portion and a pedestrian side wall portion. Also, as an internal pressure maintenance chamber is of a bag form, an outflow of an inflating gas to the main bag 46 side after inflating by causing the inflating gas to flow into the interior is easily restricted, and internal pressure in the internal pressure maintenance chamber (inner bag) is easily maintained. When such a point is not taken into consideration, an internal pressure maintenance chamber may be configured of a region enclosed by a peripheral wall of an approximate rectangular tube form wherein both ends are coupled to a vehicle body side wall portion and a pedestrian side wall portion.

Further still, in the airbag device M of the embodiment, the inner bag 65 acting as an internal pressure maintenance chamber is disposed in such a way as to cover the case 20 acting as a housing region from above when inflation of the airbag 45 is completed, with the longitudinal direction approximately following the left-right direction. Because of this, the airbag 45 when inflation is completed is such that when the pedestrian P comes into contact with a region covering the case 20 from above (actually from the front and above), the pedestrian P, rather than hitting the bottom, can be prevented from coming into contact with the case 20 through the airbag 45. The disposition position of an inner bag not being limited by the embodiment, a configuration wherein an inner bag is disposed, for example, in a position covering a wiper from above may be adopted.

Further still, in the airbag device M of the embodiment, the check valve mechanism 80 is formed in one place on each of the left and right sides in the inner bag 65, which is disposed as a form elongated in the left-right direction in such a way as to cover the case 20 from above. Because of this, an inner bag can be caused to inflate swiftly with good balance on the left and right. Of course, when such a point is not taken into consideration, a configuration wherein a check valve mechanism is disposed in an approximate left-right center of an inner bag, or on only either one of left and right end sides, may be adopted.

The disclosure relates to a pedestrian airbag device of the following configuration.

The pedestrian airbag device includes an airbag, which is housed folded in a housing region disposed in a vicinity of a rear end of a hood panel of a vehicle, and an inflator that supplies an inflating gas to the airbag, wherein the airbag is configured in such a way as to cover an upper face side of at least a region from a rear end side of the hood panel to a cowl when inflation is completed, includes a vehicle body side wall portion disposed on a body side when inflation is completed and a pedestrian side wall portion disposed opposing the vehicle body side wall portion, and is of a configuration wherein an internal pressure maintenance chamber enclosed by a peripheral wall coupled to the vehicle body side wall portion and the pedestrian side wall portion is disposed in one portion of an internal region, the internal pressure maintenance chamber is configured in such a way that an inflating gas discharged from the inflator can flow into an interior via a general inflating portion in the airbag, and a check valve mechanism that prevents a backflow to the general inflating portion side of the inflating gas that has flowed into the interior is disposed in the internal pressure maintenance chamber.

The pedestrian airbag device of the disclosure is such that a partially partitioned internal pressure maintenance chamber is disposed in an interior of the airbag. The internal pressure maintenance chamber is of a configuration wherein an inflating gas discharged from an inflator can be caused to flow into the interior via a general inflating portion in the airbag, and is configured in such a way that a backflow to a general inflating portion side of the inflating gas that has flowed into the interior can be prevented. Also, the pedestrian airbag device of the disclosure is such that the internal pressure maintenance chamber is configured of a region enclosed by a peripheral wall coupled to a vehicle body side wall portion and a pedestrian side wall portion. This means that when the pedestrian side wall portion moves in such a way as to separate from a body side when the general inflating portion inflates, the internal pressure maintenance chamber reaches a state approximating a state of negative pressure, an inflating gas is caused to flow from the general inflating portion into the interior via a check valve mechanism, and the internal pressure maintenance chamber inflates in the same way as the general inflating portion. Furthermore, the internal pressure maintenance chamber is of a configuration wherein a periphery is enclosed by the peripheral wall coupled to the vehicle body side wall portion and the pedestrian side wall portion, that is, the internal pressure maintenance chamber can be disposed in a predetermined position front-rear and left-right in the airbag when inflation is completed. Because of this, freedom of disposition position and size of the internal pressure maintenance chamber can be increased in comparison with an airbag in an existing pedestrian airbag device, and the internal pressure maintenance chamber can also be disposed in a position separated from outer peripheral edges of the pedestrian side wall portion and the vehicle body side wall portion. As a result of this, the pedestrian airbag device of the disclosure is such that by the internal pressure maintenance chamber being disposed in a predetermined place in the airbag when inflation is completed, internal pressure in the predetermined place can be maintained. Also, a pedestrian can be caught with good cushioning and protected by the internal pressure maintenance chamber in which internal pressure is maintained.

Consequently, the pedestrian airbag device of the disclosure is of a simple configuration, and internal pressure in a predetermined place can be maintained.

Also, in the pedestrian airbag device of the disclosure, it is preferable that the internal pressure maintenance chamber includes a bottom wall portion disposed in such a way as to coincide with the vehicle body side wall portion by closing off an inner side of the peripheral wall, wherein a predetermined place is coupled to the vehicle body side wall portion, and the check valve mechanism is of a configuration including a gas inflow port formed by one portion (a part) of the bottom wall portion being cut away, a joining region that causes the bottom wall portion to be joined directly to the vehicle body side wall portion in a peripheral edge of the gas inflow port, and a peripheral edge region of the gas inflow port in the bottom wall portion.

Although, in the pedestrian airbag device of the heretofore described configuration, the gas inflow port configuring the check valve mechanism formed in the internal pressure maintenance chamber is of a configuration formed by one portion (a part) of the bottom wall portion disposed in such a way as to coincide with the vehicle body side wall portion in the airbag being cut away, the internal pressure maintenance chamber is of a configuration wherein an inflating gas is caused to flow into the interior from a state of negative pressure, as heretofore described. Therefore, the inflating gas can be caused to flow smoothly into the interior of the internal pressure maintenance chamber via the gas inflow port formed in the bottom wall portion side. Also, in the periphery side of the gas inflow port, the bottom wall portion is joined directly to the vehicle body side wall portion. This means that when a pedestrian is caught by a region of the internal pressure maintenance chamber after inflation of the airbag is completed, a peripheral edge region of the gas inflow port in the bottom wall portion is restricted from becoming detached from the vehicle body side wall portion, and is of an aspect pressed to the vehicle body side wall portion side. As a result of this, the inflating gas can be appropriately restricted from flowing back from the gas inflow port to the general inflating portion side in the airbag.

Furthermore, in the pedestrian airbag device of the heretofore described configuration, it is preferable that the airbag is of a configuration including a main bag, which configures the general inflating portion, and an inner bag configuring the internal pressure maintenance chamber disposed in the main bag, wherein the inner bag includes a peripheral wall portion configuring a peripheral wall, the bottom wall portion, and a top wall portion disposed in such a way as to coincide with the pedestrian side wall portion by closing an upper end side of the peripheral wall portion.

In the pedestrian airbag device of the heretofore described configuration, the airbag is of a configuration wherein a bag-form inner bag configuring an internal pressure maintenance chamber is disposed in the interior of a main bag, because of which manufacture is easy in comparison with a case wherein an internal pressure maintenance chamber is configured by a peripheral wall being coupled directly to a vehicle body side wall portion and a pedestrian side wall portion. Also, as the internal pressure maintenance chamber is of a bag form, an outflow of an inflating gas to a main bag side after inflating by causing the inflating gas to flow into the interior is easily restricted, and internal pressure in the internal pressure maintenance chamber (inner bag) is easily maintained.

Further still, in the pedestrian airbag device of the heretofore described configuration, it is preferable that the internal pressure maintenance chamber is disposed in such a way as to cover the housing region from above when inflation of the airbag is completed, with a longitudinal direction approximately following a left-right direction. By adopting this kind of configuration, the airbag when inflation is completed is such that when a pedestrian comes into contact with a region covering the housing region from above, the pedestrian, rather than hitting the bottom, can be prevented from coming into contact with the housing region through the airbag.

Further still, in the pedestrian airbag device of the heretofore described configuration, it is preferable that the check valve mechanism is formed in one place on each of left and right sides in the internal pressure maintenance chamber. By adopting this kind of configuration, the internal pressure maintenance chamber can be caused to inflate swiftly with good balance on the left and right.

What is claimed is:

1. A pedestrian airbag device, comprising:
    an airbag, which is housed folded in a housing region disposed in a vicinity of a rear end of a hood panel of a vehicle; and
    an inflator that supplies an inflating gas to the airbag, wherein
    the airbag is configured in such a way as to cover an upper face side of at least a region from a rear end side of the hood panel to a cowl when inflation is completed, includes a vehicle body side wall portion disposed on a body side when inflation is completed and a pedestrian side wall portion disposed opposing the vehicle body side wall portion, and is of a configuration wherein an internal pressure maintenance chamber enclosed by a peripheral wall coupled to the vehicle body side wall portion and the pedestrian side wall portion is disposed in one portion of an internal region,
    the internal pressure maintenance chamber is configured in such a way that an inflating gas discharged from the inflator can flow into an interior via a general inflating portion in the airbag, and a check valve mechanism that prevents a backflow to a general inflating portion side of the inflating gas that has flowed into the interior is disposed in the internal pressure maintenance chamber,
    the internal pressure maintenance chamber includes a bottom wall portion disposed in such a way as to coincide with the vehicle body side wall portion by closing off an inner side of the peripheral wall, wherein a predetermined place of the bottom wall portion is coupled to the vehicle body side wall portion, and
    the check valve mechanism includes a gas inflow port formed by one portion of the bottom wall portion being cut away, a joining region that causes the bottom wall portion to be joined directly to the vehicle body side wall portion in a peripheral edge of the gas inflow port, and a peripheral edge region of the gas inflow port in the bottom wall portion.

2. The pedestrian airbag device according to claim 1, wherein
    the airbag includes a main bag, which configures the general inflating portion, and an inner bag configuring the internal pressure maintenance chamber disposed in the main bag, and
    the inner bag includes a peripheral wall portion configuring the peripheral wall, the bottom wall portion, and a top wall portion disposed in such a way as to coincide with the pedestrian side wall portion by closing an upper end side of the peripheral wall portion.

3. The pedestrian airbag device according to claim 1, wherein
    the internal pressure maintenance chamber is disposed in such a way as to cover the housing region from above when inflation of the airbag is completed, with a longitudinal direction approximately following a left-right direction.

4. The pedestrian airbag device according to claim 3, wherein
    the check valve mechanism is formed in one place on each of left and right sides in the internal pressure maintenance chamber.

5. The pedestrian airbag device according to claim 1, wherein
    the airbag includes a main bag, which configures the general inflating portion, and an inner bag configuring the internal pressure maintenance chamber disposed in the main bag, and
    the inner bag includes a peripheral wall portion configuring the peripheral wall, the bottom wall portion, and a top wall portion disposed in such a way as to coincide with the pedestrian side wall portion by closing an upper end side of the peripheral wall portion.

6. The pedestrian airbag device according to claim 5, wherein
    both left and right sides and a rear side of the gas inflow port are closed by the joining region, and the gas inflow port is continuous with the main bag in a front side region only.

7. The pedestrian airbag device according to claim 5, wherein
    a front upper side region of the inner bag is caused to curve in such a way as to incline gently away from the pedestrian side wall portion when inflation is completed.

* * * * *